US006865005B2

(12) United States Patent
Aoki et al.

(10) Patent No.: US 6,865,005 B2
(45) Date of Patent: Mar. 8, 2005

(54) THREE-DIMENSIONAL PHOTONIC CRYSTAL

(75) Inventors: Kanna Aoki, Wako (JP); Hideki Hirayama, Wako (JP); Yoshinobu Aoyagi, Wako (JP); Hideki Miyazaki, Tsukuba (JP)

(73) Assignees: Riken, Saitama (JP); National Institute for Materials Science, Ibaraki (JP)

( * ) Notice: Subject to any disclaimer, the term of this patent is extended or adjusted under 35 U.S.C. 154(b) by 0 days.

(21) Appl. No.: 10/058,337

(22) Filed: Jan. 30, 2002

(65) Prior Publication Data

US 2003/0020501 A1 Jan. 30, 2003

(30) Foreign Application Priority Data

Jul. 27, 2001 (JP) ........................................ 2001-228287

(51) Int. Cl.[7] .............................................. G02F 1/00
(52) U.S. Cl. ..................................................... 359/237
(58) Field of Search ........................... 359/4, 8, 10, 21, 359/129, 131, 141, 142, 237, 321, 326–332; 174/255; 385/125

(56) References Cited

U.S. PATENT DOCUMENTS 6,465,742 B1 * 10/2002 Hiraoka et al. .............. 174/255
2001/0026857 A1 * 10/2001 Kinoshita .................... 428/105

FOREIGN PATENT DOCUMENTS

CA 2330866 A1 * 7/2001 ........... H01L/21/77
WO WO 96/29621 * 9/1996 ............ G02B/5/20

OTHER PUBLICATIONS

K. Aoki et al., "Fabrication of 3D Photonic Crystal from 2D Photonic Plates by Micromanipulation", Lasers and Electro–optics, 2001. CLEO/ Pacific Rim 2001. The 4th Pacific Rim Conference on, Jul. 19, 2001, pp. I–14 to I–15.*
J.D. Joannopoulos, "The Almost Magical World of Photonic Crystals", Lasers and Electro–optics Society 1999 12th Annual Meeting. LEOS '99. IEEE, Nov. 11, 1999, pp. 232–233.*
S.Y. Lin et al., "A three–dimensional photonic crystal operating at infrared wavelengths" Nature, vol. 394, pp. 251–253, Jul. 16, 1998.

(List continued on next page.)

*Primary Examiner*—Evan Pert
(74) *Attorney, Agent, or Firm*—Birch, Stewart, Kolasch & Birch, LLP

(57) ABSTRACT

The present invention provides a practically effective three-dimensional photonic crystal, and a process for the production thereof as well as a probe used therefor wherein a three-dimensional photonic crystal comprises a plurality of two-dimensional photonic crystal plates each provided with through holes and different types of two-dimensional photonic crystals; a plurality of positioning members to be located in the above-described through holes in the plurality of the two-dimensional photonic crystal plates; and the above-described positioning members being located in the through holes in the two-dimensional photonic crystal plates adjacent to each other among the pluralities of two-dimensional photonic crystal plates to be laminated in such that the pluralities of the two-dimensional photonic crystal plates obtain a periodic structure in response to wavelengths of light.

4 Claims, 22 Drawing Sheets

OTHER PUBLICATIONS

J.G. Fleming et al. "Three-dimensional photonic crystal with a stop band from 1.35 to 1.95 $\mu$m" Optics Letters, vol. 24, No. 1, pp. 49–51, Jan. 1, 1999.

S.Y. Lin et al., "Physical Review B," Third Series, vol. 59, No. 24, R15 579–R15 582, Jun. 15, 1999 II.

C.C. Cheng et al., "Fabrication of photonic band-gap crystals", J. Vac. Sci.–Technol. B, vol. 13(6), pp. 2696–2700, Nov/Dec 1995.

S. Kawakami, "Fabrication of submicrometre 3D periodic structures composed of $Si/SiO_2$", Electronics Letters, vol. 33, No. 14, Jul. 3, 1997.

N. Yamamoto et al., "Development of One Period of a Three–Dimensional Photonic Crystal in the 5–10 $\mu$m Wavelength Region by Wafer Fusion and Laser Beam Diffraction Pattern Observation Techniques" Jpn. J. Appl. Phys., vol. 37, pp. L1052–L1054, Sep. 15, 1998.

* cited by examiner

FABRICATION OF AIR BRIDGE TYPE TWO-DIMENSIONAL PHOTONIC CRYSTAL PLATE

InP/InGaAs LAYER GROWTH ACCORDING TO MOCVD
- InP
- InGaA
- InP SUBSTRATE

EB LITHOGRAPHY & DRY ETCHING

MAKING TO BE AIR BRIDGE
ACCORDING TO WET ETCHING

RELATIONSHIP BETWEEN RATIO OF WIDHT OF BLOCK AND ITS PERIOD, AND REGION WHERE BANDGAP OF 4 MICRON BAND OPENS IN CASE WHEN InP PLATE THICKNESS IS 0.5 MICROMETER

TWO-DIMENSIONAL PHOTONIC CRYSTAL PLATES
EACH HELD BY NARROW FOUR BRIDGES IN MIDAIR

AIR-BRIDGING TWO-DIMENSIONAL
PHOTONIC CRYSTAL PLATE

LOCATING MICROSPHERES ARE
INSERTED INTO POSITIONING
THROUGH HOLES

PATTERN IS TRANSFERRED DOWN
TO InP SUBSTRATE IN CASE OF ETCHING

PATTERN ETCHED ON InP SUBSTRATE IS
FIRST LAYER, AND PLATES ARE
SEQUENTIALLY LAMINATED
THEREON

ANOTHER TWO-DIMENSIONAL PHOTONIC CRYSTAL PLATE IS CUT OFF AND PICKED UP

THE PLATE THUS PICKED UP IS PLACED ON TWO-DIMENSIONAL PHOTONIC CRYSTAL PLATE INTO WHICH MICROSPHERES HAVE BEEN INSERTED

SPHERES ARE INSERTED INTO POSITIONING HOLES IN PATTERNS TRANSFERRED ON InP SUBSTRATE

TWO-LAYER LAMINATION

THREE-LAYER LAMINATION

STATE WHEREIN BRIDGES ARE PUSHED BY PROBE TO CUT OFF TWO-DIMENSIONAL PHOTONIC CRYSTAL PLATE FROM OUTER HULL REGION OF SUBSTRATE

STATE WHEREIN TWO-DIMENSIONAL PHOTONIC CRYSTAL PLATE WHICH HAD BEEN CUT OFF AND HAS BEEN PICKED UP BY PROBE IS BROUGHT ON TWO-DIMENSIONAL PHOTONIC CRYSTAL PLATE INTO WHICH POSITIONING MICROSPHERES HAVE BEEN ALREADY INSERTED

STATE WHEREIN TWO-DIMENSIONAL PHOTONIC CRYSTAL PLATES HAVE BEEN SUBSTANTIALLY PERFECTLY SUPERPOSED

REFLECTION SPECTRA OF THREE-DIMENSIONAL PHOTONIC CRYSTAL

COMB TYPE ELECTRODE SECTION
(FIRST ELECTRODE 414 AND SECOND ELECTRODE 416)

FIGURE SHOWING THE CASE WHEN ONLY FIRST ELECTRODE 414
AND SECOND ELECTRODE 416 ARE FORMED

COMB TYPE ELECTRODE SECTION
(FIRST ELECTRODE 414 AND
SECOND ELECTRODE 416)

CASE WHERE POSITIONING IS CONDUCTED BY USING THROUGH HOLES DEFINED ON PATTERNS IN TWO-DIMENSIONAL PHOTONIC CRYSTALS

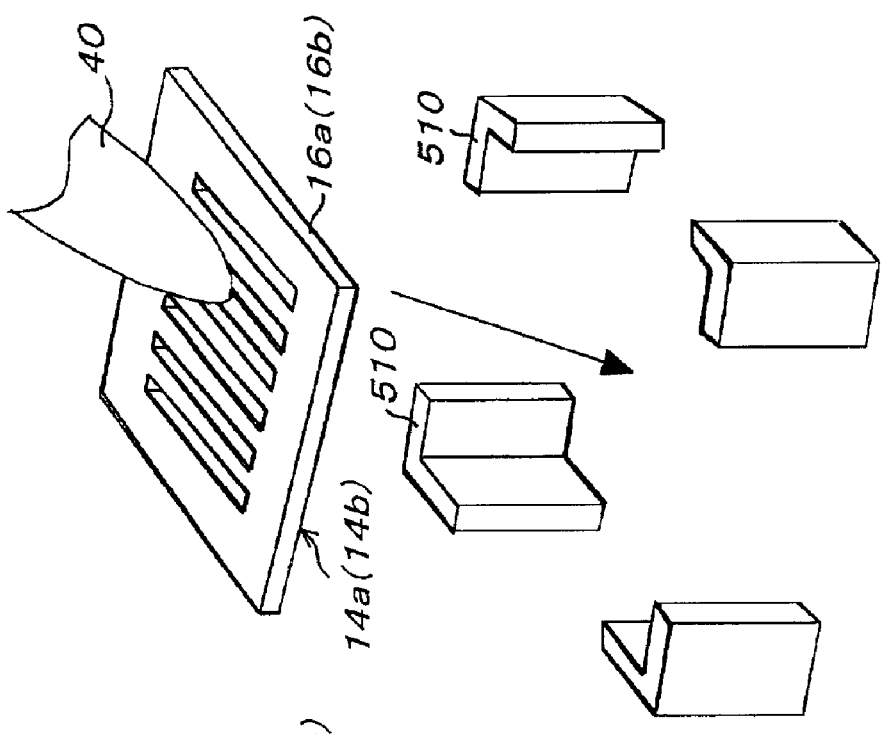
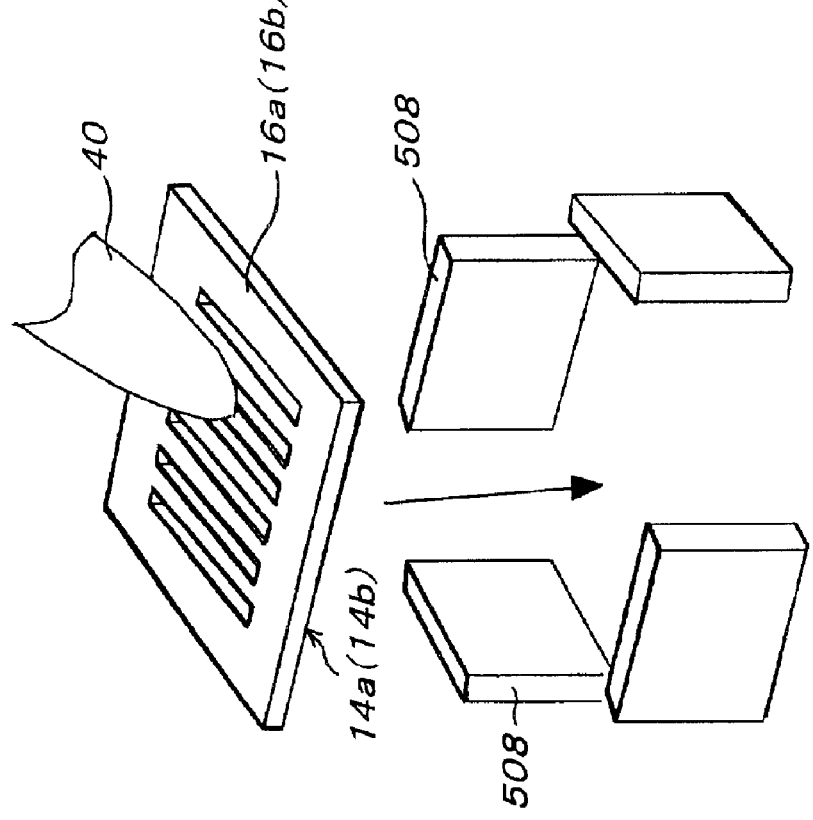

THREE-DIMENSIONAL PHOTONIC CRYSTAL

BACKGROUND OF THE INVENTION

1. Field of the Invention

The present invention relates to a three-dimensional photonic crystal and a process for the production thereof as well as a probe used therefor, and more particularly to a three-dimensional photonic crystal into which an optical phase shift region (defect region) can be inserted arbitrarily, so that which is used suitably in case of constituting semiconductor lasers, optical waveguides and the like, and a process for the production thereof as well as a probe used therefor.

2. Description of the Related Art

Heretofore, a photonic crystal having a similarity as that of solid crystal and involving an artificial periodic structure has been known. More specifically, photonic crystal is the one having a two- or a three-dimensionally periodic structure wherein two or more types of dielectrics, semiconductors, metals and air are alternately disposed in a repeated manner with a period corresponding to around optical wavelengths.

In the present specification, it is to be noted that photonic crystal having a two-dimensionally periodic structure is referred to as "two-dimensional photonic crystal", while photonic crystal having a three-dimensionally periodic structure is referred to as "three-dimensional photonic crystal".

In solid crystal, atoms are disposed periodically wherein a wave of electron exhibits a certain particular behavior while capturing a periodicity of the crystal. Likewise, in a periodic structure of photonic crystal, not a wave of electrons, but a wave of light exhibits a certain particular behavior, which is determined by energy dispersion characteristics and referred to as photonic band. Furthermore, in photonic crystal, it is possible to produce a forbidden gap wherein existence of light can be forbidden, which is referred to as "photonic bandgap".

From the facts as described above, it is assumed that there is a high possibility being capable of freely controlling light by an optical device constituted from three-dimensional photonic crystals, as in the case where a semiconductor device can control freely electrons.

For this reason, a manner for producing three-dimensional photonic crystals has been proposed heretofore as a prerequisite for fabricating an optical device constituted by three-dimensional photonic crystals, for example, three-dimensional etching method, wafer fusion laminating method, automatic cloning method or the like method is known in this respect.

Three-dimensional etching method means a method wherein a substrate is etched at various angles to produce three-dimensional photonic crystals involving three-dimensional structures. Furthermore, wafer fusion laminating method is the one wherein a plurality of semiconductors formed into striped shapes are accurately positioned to laminate with each other by the use of a laser beam diffraction pattern, whereby three-dimensional photonic crystals involving three-dimensional structures are produced. Moreover, automatic cloning method is the one wherein an irregular surface has been previously formed on a substrate, and crystals are grown on the irregular surface retaining the surface morphology, whereby three-dimensional photonic crystals having three-dimensional structures are prepared.

However, any of the above-described conventional methods is not sufficient for producing three-dimensional photonic crystals applicable to optical devices, so that a proposition for a practically effective and novel method has been strongly demanded.

OBJECT AND SUMMARY OF THE INVENTION

The present invention has been made in view of the above-described needs.

Accordingly, an object of the invention is to provide a practically effective three-dimensional photonic crystal and a process for the production thereof as well as a probe used therefor.

In order to achieve the above-described object, a three-dimensional photonic crystal, a process for the production thereof as well as a probe used therefor according to the present invention are arranged in such that a three-dimensional photonic crystal having a stereoscopic structure is intended to fabricate by positioning a plurality of plates in which two-dimensional photonic crystals have been formed, so that these plates are laminated with each other.

Namely, a three-dimensional photonic crystal according to the present invention comprises a plurality of two-dimensional photonic crystal plates each provided with different types of two-dimensional photonic crystals; and the pluralities of two-dimensional photonic crystal plates being positioned respectively to be laminated so as to obtain a periodic structure in response to wavelengths of light.

Furthermore, a three-dimensional photonic crystal according to the present invention comprises a plurality of two-dimensional photonic crystal plates each provided with through holes and different types of two-dimensional photonic crystals; a plurality of positioning members to be located in the above-described through holes in the plurality of the two-dimensional photonic crystal plates; and the above-described positioning members being located in the through holes in the two-dimensional photonic crystal plates adjacent to each other among the pluralities of two-dimensional photonic crystal plates to be laminated in such that the pluralities of the two-dimensional photonic crystal plates obtain an accurate periodic structure in response to wavelengths of light.

Moreover, a three-dimensional photonic crystal according to the present invention comprises a flat plate-like first two-dimensional photonic crystal plate provided with first through holes on a first frame as well as with first two-dimensional photonic crystals in a region inside the first frame; a flat plate-like second two-dimensional photonic crystal plate provided with second through holes, being positioned with respect to the above-described first through holes, on a second frame as well as with a second two-dimensional photonic crystal in a region inside the second frame; positioning members located in such that the first through holes being communicated with the second through holes; and the above-described positioning members being located in such that the through holes in the first two-dimensional photonic crystal plate being communicated with the through holes in the second two-dimensional photonic crystal plate to be positioned, whereby the first two-dimensional photonic crystal plate is laminated with the second two-dimensional photonic crystal plate so as to obtain an accurate periodic structure in response to wavelengths of light.

Further, a three-dimensional photonic crystal according to the present invention may be modified in such that the above-described first through holes and the above-described second through holes are circular holes, respectively, a radius in each of the circular holes is substantially equal to thicknesses of the first two-dimensional photonic crystal plate and the second two-dimensional photonic crystal plate, and each of the above-described positioning members is a sphere having a diameter corresponding to substantially doubled radius of the circular hole.

Still further, a process for the production of a three-dimensional photonic crystal according to the present invention comprises the steps of allowing pluralities of two-dimensional photonic crystal plates each provided with different types of two-dimensional photonic crystals to adhere or to be held onto the extreme end of a probe in accordance with micromanipulation thereby moving them, respectively; and positioning the pluralities of two-dimensional photonic crystal plates with each other by means of moving them wherein these two-dimensional photonic crystal plates have been allowed to adhere or to be held onto the extreme end of the probe, so that the pluralities of two-dimensional photonic crystal plates are laminated so as to obtain an accurate periodic structure in response to wavelengths of light.

Yet further, a process for the production of a three-dimensional photonic crystal according to the present invention may be modified in such that the above-described two-dimensional photonic crystal plates are allowed to adhere or to be held onto the extreme end of the probe by means of electrostatic adhesive force wherein a predetermined voltage is applied to the probe.

Besides, a process for the production of a three-dimensional photonic crystal according to the present invention may be modified in such that the above-described two-dimensional photonic crystal plates are connected to outer hull regions with bridges held in midair; and applying a load to the bridges with the probe to break down them thereby allowing the two-dimensional photonic crystal plates to adhere on the extreme end of the probe to move them as a result of such break-down of the bridges.

In addition, a process for the production of a three-dimensional photonic crystal according to the present invention may be modified in such that the above-described respective positioning of the pluralities of two-dimensional photonic crystal plates is conducted by moving each of the pluralities of two-dimensional photonic crystal plates with the probe, and each of the pluralities of two-dimensional photonic crystal plates is allowed to abut against a structural body having a predetermined shape.

Furthermore, a process for the production of a three-dimensional photonic crystal according to the present invention may be modified in such that each of the above-described pluralities of two-dimensional photonic crystal plates is a flat plate-like body wherein through holes have been defined on its frame part, besides a region inside the frame part is provided with different types of two-dimensional photonic crystals from one another; and positioning members are located in the through holes in two-dimensional photonic crystal plates adjacent to each other among the pluralities of two-dimensional crystal plates to position them, whereby the pluralities of two-dimensional photonic crystal plates are laminated so as to obtain a periodic structure in response to wavelengths of light.

Moreover, a process for the production of a three-dimensional photonic crystal according to the present invention may be modified in such that each of the above-described through holes is a circular hole; a radius of the circular hole is substantially equal to each thickness of the pluralities of two-dimensional photonic crystal plates; and each of the above-described positioning members is a sphere a diameter of which is equal to a substantially doubled radius of the circular hole.

Further, a process for the production of a three-dimensional photonic crystal according to the present invention may be modified in such that a micro- and/or submicrometer sized part for constituting an optical phase controlling region is inserted by means of the above-described probe in the case when the pluralities of two-dimensional photonic crystal plates are laminated so as to obtain a periodic structure in response to wavelengths of light.

Still further, a probe according to the present invention comprises an inner core made of a metal; an insulating layer formed around the inner core; an outer metallic film formed on the outer periphery of the insulating layer except for the extreme end portion thereof; the extreme end portion of the insulating layer having a shape of a flat surface; and an electric field being generated in the vicinity of marginal portion of the extreme end portion by applying a voltage across the inner core and the outer metallic film, so that a material is electrostatically sticked.

Yet further, a probe according to the present invention comprises an insulator needle with the extreme end portion of which is a flattened surface; a first electrode and a second electrode disposed on the insulator needle so as to constitute a comb electrode in the above-described flattened surface of the extreme end portion in the insulator needle; an insulating film covering the above-described insulator needle provided with the first electrode and the second electrode; a metallic shield formed on the outer periphery of the insulating film except for a side of the extreme end portion, which is the flattened surface of the insulator needle; and an electric field being generated over the flattened surface in the extreme end portion of the insulator needle by applying different voltages with respect to the metallic shield from one another to the first electrode and the second electrode, respectively, so that a material is electrostatically sticked to the extreme end portion of a probe.

Therefore, a practically effective three-dimensional photonic crystal, and a process for the production thereof as well as a probe used therefor can be provided in accordance with the above-described present invention.

In other words, it is possible to implement accurate lamination of two-dimensional photonic crystal plates, even if patterns of two-dimensional photonic crystal become how much complicated.

Besides, since two-dimensional photonic crystal plates or parts such as positioning members, which extend from a submicron to a micron order, can be freely assembled with each other, light-emitting materials or materials having different refractive indices can be introduced into a dot-like or an arbitrary region as a light control region (defect region). Accordingly, a manner capable of fabricating freely such three-dimensional structure as described above is an indispensable technique for making photonic crystals to become optical devices.

BRIEF DESCRIPTION OF THE DRAWING

The present invention will become more fully understood from the detailed description given hereinafter and the accompanying drawings which are given by way of illustration only, and thus are not limitative of the present invention, and wherein:

FIGS. 1(a) and 1(b) are views each showing a three-dimensional photonic crystal according to an example of a preferred embodiment of the present invention wherein FIG. 1(a) is a front perspective view, and FIG. 1(b) is an exploded perspective view of FIG. 1(a);

FIGS. 8(a) and 8(b) are electron micrographs wherein FIG. 8(a) is the one showing a state in which positioning members are positioned into holes of a first layer, and FIG. 8(b) is an enlarged one showing a part enclosed by a white rectangle in FIG. 8(a);

FIGS. 9(a) and 9(b) are electron micrographs wherein FIG. 9(a) is the one showing a state in which two layers of two-dimensional photonic crystal plates are laminated, and FIG. 9(b) is an enlarged one of a part enclosed by a white rectangle in FIG. 9(a);

FIGS. 10(a) and 10(b) are electron micrographs wherein FIG. 10(a) is the one showing a state in which three layers of two-dimensional photonic crystal plates are laminated, and FIG. 10(b) is an enlarged one of a part enclosed by a white rectangle in FIG. 10(a);

FIGS. 19(a) and 19(b) are explanatory views each showing a further positioning method for two-dimensional photonic crystal plates.

DETAILED DESCRIPTION OF THE PREFERRED EMBODIMENTS

In the following, an example of a preferred embodiment of a three-dimensional photonic crystal and a process for the production thereof as well as a probe used therefor according to the present invention will be described in detail by referring to the accompanying drawings.

Figures 1A, 1B:
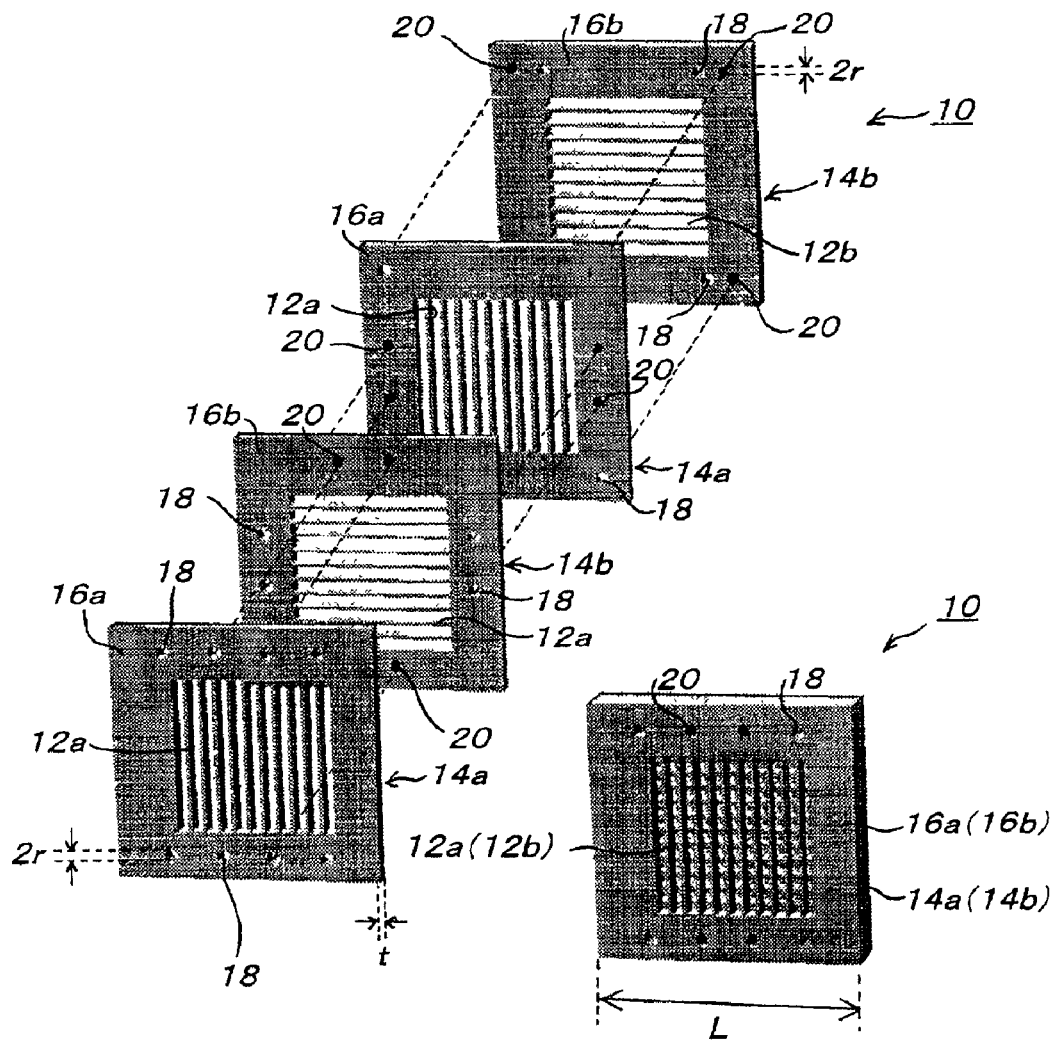

FIGS. 1(a) and 1(b) are views each showing a three-dimensional photonic crystal according to an example of a preferred embodiment of the present invention wherein FIG. 1(a) is a front perspective view, and FIG. 1(b) is an exploded perspective view of FIG. 1(a).

Namely, a three-dimensional photonic crystal 10 is prepared by laminating alternately a flat plate-like two-dimensional photonic crystal plate 14a involving a two-dimensional photonic crystal 12a with a flat plate-like two-dimensional photonic crystal plate 14b, a type of which is different from that of the two-dimensional photonic crystal plate 14a, involving a two-dimensional photonic crystal 12b in a period of around wavelengths of light.

In the two-dimensional photonic crystal plate 14a (or 14b), the two-dimensional photonic crystal 12a (or 12b) is prepared by repeating alternately two or more types of dielectrics, semiconductors, metals, air and the like with a period of around wavelengths of light in a region inside a frame 16a (or 16b). In the present embodiment, the two-dimensional photonic crystal 12a formed in a region inside the frame 16a has involved the same pattern as that of the two-dimensional photonic crystal 12b formed in a region inside the frame 16b. In this respect, when these two-dimensional photonic crystals each having the same pattern are rotated at 90° with each other to laminate them, two types of two-dimensional photonic crystals are laminated.

With respect to the two-dimensional photonic crystal plate 14a and the two-dimensional photonic crystal plate 14b, the two-dimensional photonic crystal 12a and the two-dimensional photonic crystal 12b as well as a region of the frame 16a and a region of the frame 16b are dimensioned so as to coincide with each other, when they are superposed one another as shown in FIG. 1(a). It is to be noted that a size of the two-dimensional photonic crystal 12a must coincide with that of the two-dimensional photonic crystal 12b, when both of the two-dimensional photonic crystals 12a and 12b are superposed one another (in other words, a region defined by the inside of the frame 16a must coincide with that defined by the inside of the frame 16b, when both of the frames 16a and 16b are superposed one another), but it is not necessarily required to coincide an outer region of the frame 16a with that of the frame 16b, when both the frames 16a and 16b are superposed one another.

In the present embodiment, although outer regions of the two-dimensional photonic crystals 12a and 12b (in other words, inside regions of the frames 16a and 16b) as well as outer regions of the frames 16a and 16b are shaped in squares, respectively, the invention is not limited to such square shapes as a matter of course.

Each thickness t of the two-dimensional photonic crystal plates 14a and 14b is, for example, from around 3 nm to 1 mm. Furthermore, a side L of the square two-dimensional photonic crystal plate 14a or two-dimensional photonic crystal plate 14b is, for example, from around 10 nm to 10 mm, so that a square measure "L×L" of the two-dimensional photonic crystal plate 14a or the two-dimensional photonic crystal plate 14b is, for example, from around "10 nm×10 nm=100 nm$^2$" to "10 mm×10 mm=100 mm$^2$".

A plurality of circular through holes 18 is defined on proper positions in the frames 16a and 16b, respectively. Dimensions and alignments of the plurality of through holes defined on these frames 16a and 16b are arranged in such that at least parts of them coincide to communicate with each other in the case when the two-dimensional photonic crystal plate 14a is superposed on the two-dimensional photonic crystal plate 14b. Moreover, a radius r of the through hole 18 (i.e., a diameter of the through hole 18 is 2r.) is dimensioned to correspond to the thickness t of the two-dimensional photonic crystal plate 14a or the two-dimensional photonic crystal plate 14b with each other.

In the three-dimensional photonic crystal 10, a microsphere 20 being a spherical body having a diameter 2r corresponding to the diameter 2r of the through hole 18 is used for a positioning member, which is inserted into the through holes 18 and 18 in the adjacent two-dimensional photonic crystal plates 14a and 14b, respectively, to position these photonic crystal plates 14a and 14b, when they are laminated. As a result, the two-dimensional photonic crystal plate 14a and the two-dimensional photonic crystal plate 14b are laminated at an adequate position.

The three-dimensional photonic crystal 10 having the above-described constitution is fabricated by superposing the two-dimensional photonic crystal plate 14a and the two-dimensional photonic crystal plate 14b. In this case, the superposition is made by the use of a probe in accordance with a micromanipulation method.

More specifically, first, the microsphere 20 is fitted into the through hole 18 of the two-dimensional photonic crystal plate 14a (or the two-dimensional photonic crystal plate 14b) to locate the microsphere 20 therein by the use of a probe in accordance with a micromanipulation method.

In this case, the probe includes a needle with an extreme end of which has a diameter of from a submicron to a micron order, the one involving an electrode structure therein for electrostatic adhesion, and the one having a minute handling mechanism such as forceps or the like at the extreme end thereof.

In the case where the microsphere 20 is fitted into the through hole 18 of the two-dimensional photonic crystal plate 14a (or the two-dimensional photonic crystal plate 14b), a half of the microsphere 20 protrudes from a surface of the two-dimensional photonic crystal plate 14a (or the two-dimensional photonic crystal plate 14b).

Then, a pattern of the two-dimensional photonic crystal 12a (or the two-dimensional photonic crystal 12b), which has been rotated at 90° with respect to the pattern of the neighboring 2D photonic crystal and half-pitch shifted from the next-neighboring 2D photonic plate wherein the microspheres 20 have been fitted into the through holes 18, is prepared. Another through hole 18 in the former two-dimensional photonic crystal plate 14b (or the two-dimensional photonic crystal plate 14a) is mounted on each half of the microspheres 20 protruded from the surface of the latter two-dimensional photonic crystal plate 14a (or the two-dimensional photonic crystal plate 14b) to position these photonic crystal plates, whereby the two-dimensional photonic crystal plate 14a and the two-dimensional photonic crystal plate 14b are laminated one another. Two-dimentional photonic plates 14a, 14b are sequentially laminated by repeating above-mentioned procedure.

As a result of repeating the above-described operations, a three-dimensional photonic crystal 10 having a three-dimensionally periodic structure can be produced.

In the following, a process for the production of the three-dimensional photonic crystal 10 will be described in detail by referring to examples.

(1) Crystal Growth

Figure 2A:
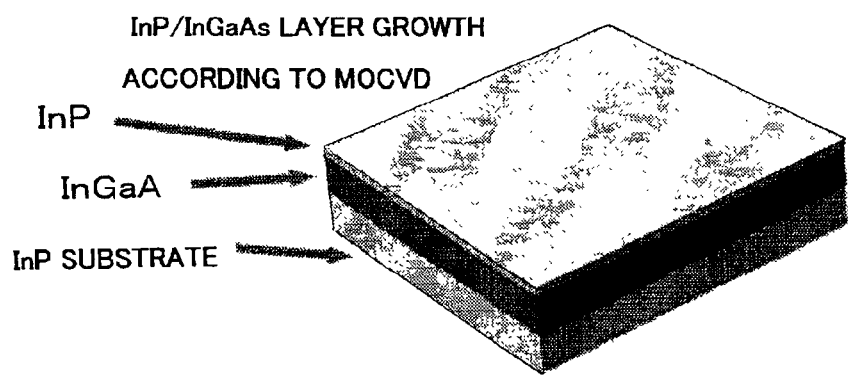
FIGS. 2(a), 2(b), and 2(c) are explanatory views each showing a manner for fabricating an air bridge type two-dimensional photonic crystal plate.
Figure 2B:
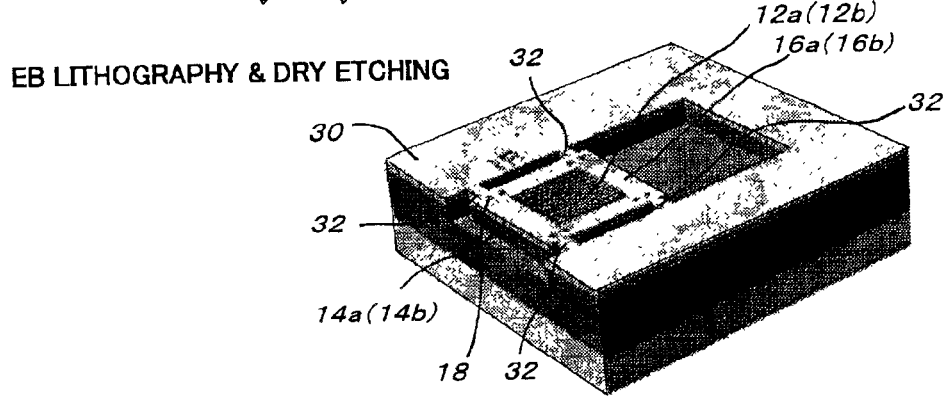

First, a manner for preparing a two-dimensional photonic crystal plate 14a and a two-dimensional photonic crystal plate 14b will be described by referring to FIGS. 2(a), 2(b), and 2(c). The two-dimensional photonic crystal plate 14a and the two-dimensional photonic crystal plate 14b are prepared by growing crystal layers on a predetermined substrate.

In the present example, the following condition was used.

Substrate InP (direction of crystal plane)±0.5 degree

Indium Source Trimethylindium (TMI: In(CH$_3$)$_3$)

Gallium Source Triethylgallium (TEG: Ga(CH$_2$CH$_3$)$_3$)

Phosphorous Source Phosphine (PF$_3$)

Arsenic Source Arsine (AsH$_3$)

Growth Temperature 640 degrees celsius to 680 degrees celsius

As a manner for growing crystals, MOVCD (Metal-Organic Chemical Vapor Deposition) method was used. TMI is a solid at room temperatures, while TEG is a liquid at room temperatures. Accordingly, hermetically sealed containers each containing either of these compounds were disposed in a temperature controlled bath at a temperature of from 20 degrees celsius to 30 degrees celsius, hydrogen was fed to the inside of the containers to saturate the TMI and the TEG with hydrogen, respectively, and the resulting products were supplied to a reactor. On an InP substrate, 1 μm to 3 μm of indium-gallium-arsenide (InGaAs) was grown, and 0.5 μm to 2 μm of indium-phosphide (InP) was further grown thereon (see FIG. 2(a)).

(2) Fabrication of Mask

In order to use as a mask in the following dry etching, 20 nm of titanium was deposited on the substrate, which was fabricated in accordance with the above-described manner of "(1) Crystal Growth", by means of vapor deposition, and 400 nm to 1 μm of nickel were deposited on the resulting titanium.

(3) Drawing

A resist "ZEP520-22" (trademark) was used for electron-beam lithography. Five hundred (500) nm thickness of the "ZEP520-22" (trade mark) were applied on the nickel layer prepared in the above-described step "(2) Fabrication of Mask", and the resulting product was heated at 180 degrees for 20 minutes.

In this case, a device used for drawing a pattern for the two-dimensional photonic crystals 12a, 12b is JBX-5D II (manufactured by JEOL). The pattern exhibits a structure, as shown in FIG. 2(b), wherein the two-dimensional photonic crystal plate 14a (14b) is connected to an outer hull region 30 of the substrate by means of narrow bridges 32, whereby the photonic crystal plate 14a (14b) is supported by these bridges 32. In this arrangement, through holes 18 for inserting microspheres 20 are defined at sites on a frame 16a (16b). In the present example, each circular hole having 1 μm diameter is defined.

Until now, where there appears a photonic bandgap is only in diamond and quasidiamond structures. A pattern shown in the present example, i.e., a pattern of the two-dimensional photonic crystal 12a or the two-dimensional photonic crystal 12b shown in FIGS. 1(a) and 1(b) as well as FIGS. 2(a), 2(b), and 2(c) is for constituting a quasidiamond structure so-called "woodpile" structure. The woodpile structure is the one wherein blocks are aligned in a striped-form, and then, further blocks are aligned thereon in such that the upper blocks become perpendicular striped-form, respectively with respect to the under blocks, so that a first layer and a third layer are out of alignment with respect to a second layer and a fourth layer, respectively, with an interval of each half period.

Figure 3:
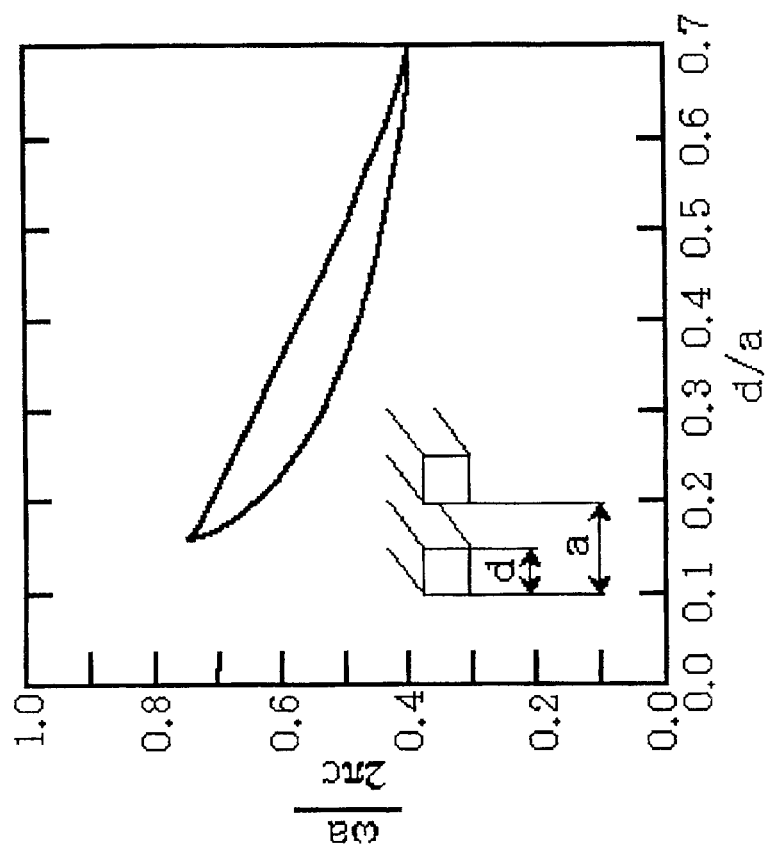
FIG. 3 is a graphical representation indicating a relationship between the standerized frequency and the ratio of widths and periods of a block to have a photonic band gap formed in the case where a wood pile structure is formed by using InP as a material.

A pattern of the two-dimensional photonic crystal 12a or the two-dimensional photonic crystal 12b shown in FIGS. 1(a) and 1(b) is designed so as to consequently obtain a woodpile structure, when laminated the two-dimensional photonic crystal plate 14a and the two-dimensional photonic crystal plate 14b while positioning them to be fixed at accurate positions by the use of the through holes 18 being the ones for positioning components therein and the microspheres 20 being the ones for positioning the components therewith. In the case where a material InP is used and designed so as to open a photonic bandgap in 4 μm range, a relationship between widths and periods where the photonic bandgap opens is as indicated in FIG. 3, when a thickness of a plate is secured to 0.5 μm. A size of the two-dimensional photonic crystal plate 14a or the two-dimensional photonic crystal plate 14b may be arranged in such that a side L thereof is increased up to around 60 μm.

After drawing a pattern, the pattern was developed in the following condition. Namely, a developing solution and a cleaning solution are as follows.

Developing Solution: Orthoxylene (o-xylene; an organic compound wherein methyl groups (CH$_3$—) are combined at adjacent corners of benzene ring):isopropyl alcohol; (CH3)$_2$CHOH)=8:1

Cleaning Solution: Isopropyl alcohol

The two-dimensional photonic crystal plate 14a (14b) thus drawn is maintained in the developing solution for a period of from 20 seconds to 3 minutes, and then, it is further maintained in the cleaning solution for a period of from 20 seconds to 3 minutes. Thereafter, the cleaning solution is dried off with an air gun from the resulting two-dimensional photonic crystal plate 14a (14b).

(4) Dry Etching (4-1) Transfer of the Pattern from a Resist to a Metal Mask

For dry etching of the metal mask, an electron cyclotron resonance (ECR) ion shower device was used. A condition for etching a Ni layer is as follows.

Gas: Argon
Pressure: $0.5 \times 10^{-4}$ Torr to $1.5 \times 10^{-4}$ Torr
Acceleration Voltage: 0.5 kV to 1.0 kV
Microwave Output: 50 W to 100 W
Ion Current Density: 0.4 mA/cm$^2$ to 0.8 mA/cm$^2$
Etching Time: 5 minutes to 10 minutes
Temperature: Room temperature Subsequently, titanium is etched wherein a condition therefor is as follows.

Gas: Carbon tetrafluoride (CF$_4$)
Pressure: $0.5 \times 10^{-4}$ Torr to $1.5 \times 10^{-4}$ Torr
Acceleration Voltage: 0.5 kV to 1.0 kV
Microwave Output: 50 W to 100 W
Ion Current Density: 0.4 mA/cm$^2$ to 0.8 mA/cm$^2$
Etching Time: 5 minutes to 10 minutes
Temperature: Room temperature In order to completely remove a resist remained at the last, the resist is burned off in the following condition.

Gas: Oxygen
Pressure: $0.5 \times 10^{-4}$ Torr to $1.5 \times 10^{-4}$ Torr
Acceleration Voltage: 0.5 kV to 1.0 kV
Microwave Output: 50 W to 100 W
Ion Current Density: 0.4 mA/cm$^2$ to 0.8 mA/cm$^2$
Etching Time: 5 minutes to 10 minutes
Temperature: Room temperature (4-2) Transfer of the Pattern from the Metal Mask to an InP Layer Inductively Coupled Plasma (ICP) was used for etching the InP. Etching was made under chlorine (Cl$_2$) atmosphere for a period of from 30 seconds to 3 minutes.

(5) Wet Etching (5-1) Release of the Metal Mask

For the sake of releasing the metal mask left in the dry etching treatment as described in the paragraph (4), the resulting two-dimensional photonic crystal plate 14a (14b) is shaken in buffered hydrofluoric acid (20.8%) for about 10 minutes, and washed finally with pure water. Although a nickel layer is not dissolved into the buffered hydrofluoric acid, a titanium layer laid under the nickel layer is dissolved, so that the metal mask can be removed completely.

(5-2) Partial Dissolution of InGaAs

Figure 2C:
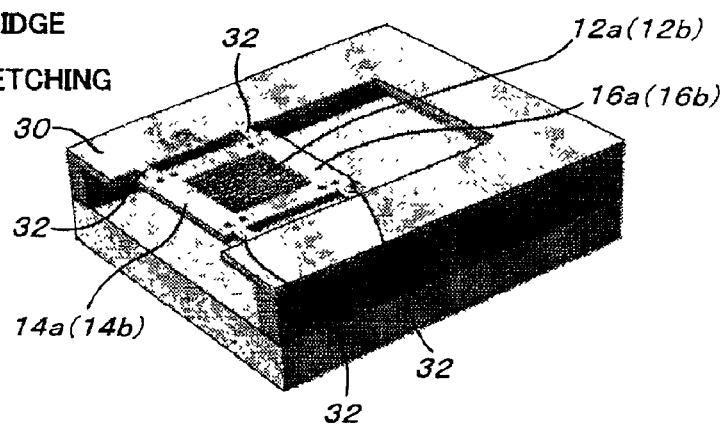

For the sake of obtaining such a state wherein the two-dimensional photonic crystal plate 14a (14b) made of InP is supported merely on an outer hull region 30 with bridges 32 (see FIG. 2(c)) as a result of solving out and removing an InGaAs layer laid under the two-dimensional photonic crystal plate 14a (14b) of InP, the two-dimensional photonic crystal plate 14a (14b) is shaken in an etching solution (sulfuric acid:hydrogen peroxide:water=1:1:3) for a period of 10 seconds to 60 seconds, and then, the resulting two-dimensional photonic crystal plate 14a (14b) is washed with pure water.

Figure 4:
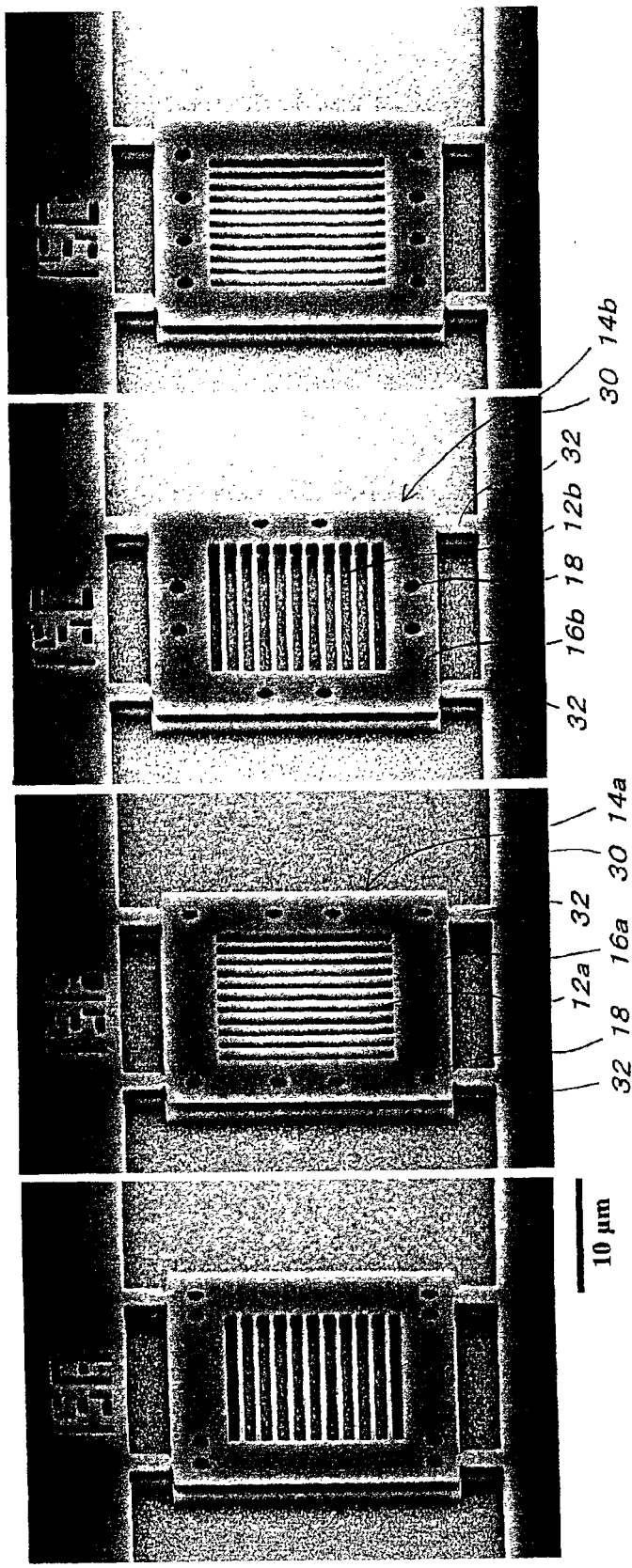
FIG. 4 shows electron micrographs of two-dimensional photonic crystal plates.

In FIG. 4, electron micrographs of the two-dimensional photonic crystal plate 14a (14b) obtained by a manner as described above are shown.

It is to be noted herein that such two-dimensional photonic crystal plate 14a (14b) connected to the outer hull region 30 with only narrow bridges 30 in a state wherein it is held by the bridges 32 just like it floats in midair is referred to as "air bridge type two-dimensional photonic crystal plate".

(6) Lamination

The air bridge type two-dimensional photonic crystal plate 14a (14b) formed as described above is secured to a micromanipulation device.

In this case, the micromanipulation device means the one for manipulating a material of a submicron to micron order. The micromanipulation device is provided with a sample table, and probes wherein the air bridge type two-dimensional photonic crystal plate 14a (14b) can be separated or picked up from the outer hull region 30 by manipulating freely a probe or the like.

The micromanipulation device has been disposed in a sample chamber of a scanning electron microscope, and the two-dimensional photonic crystal plates 14a (14b) were laminated under observation of the electron microscope while manipulating a joy stick electrically connected to a movable shaft of the micromanipulation device. Since the present micromanipulation device may be provided with three probes at a time, when probes having different thicknesses from one another are mounted to the micromanipulation device according to application, a variety of manipulations can be continuously carried out without breaking vacuum each time.

In the following, procedure steps for preparing a three-dimensional photonic crystal 30 by laminating two-dimensional photonic crystal plates 14a (14b) will be described by referring to FIGS. 5(a), 5(b) through FIGS. 7(a), 7(b).

(1) Procedure Step 1

Microspheres 20 have been strewed around an air bridge type two-dimensional photonic crystal plate 14a (14b). In this case, such a situation that the microspheres 20 are positioned on the air bridge type two-dimensional photonic crystal plate 14a (14b) must be avoided.

Figure 5A:
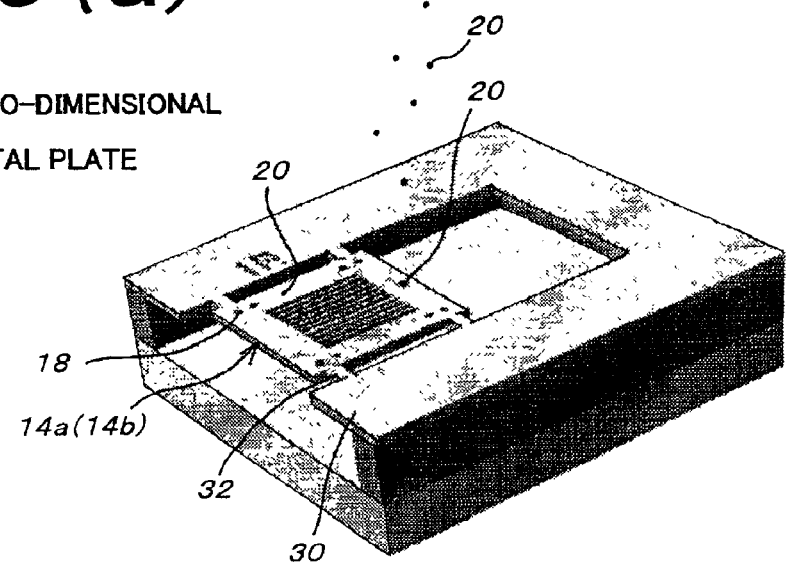
FIGS. 5(a) and 5(b) are explanatory views each showing a manner for constituting a three-dimensional photonic crystal by positioning the positioning members into the through holes.
Figure 5B:
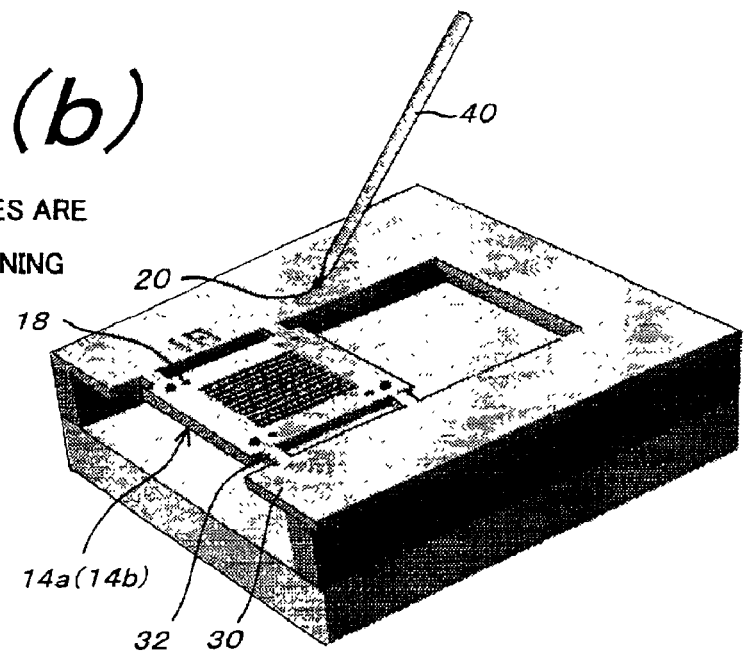
Figure 6A:
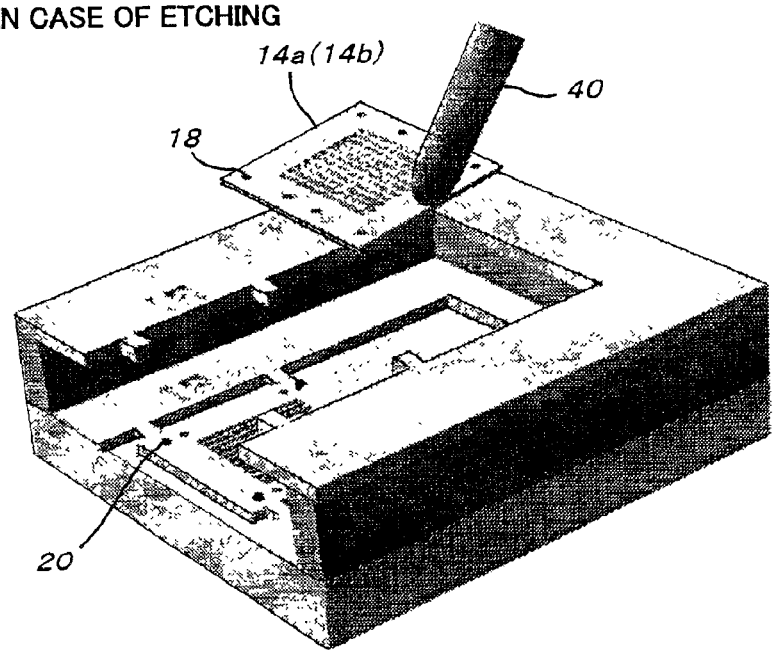
FIGS. 6(a) and 6(b) are explanatory views each showing a manner for constituting a three-dimensional photonic crystal by laminating two-dimensional photonic crystal plates.
Figure 6B:
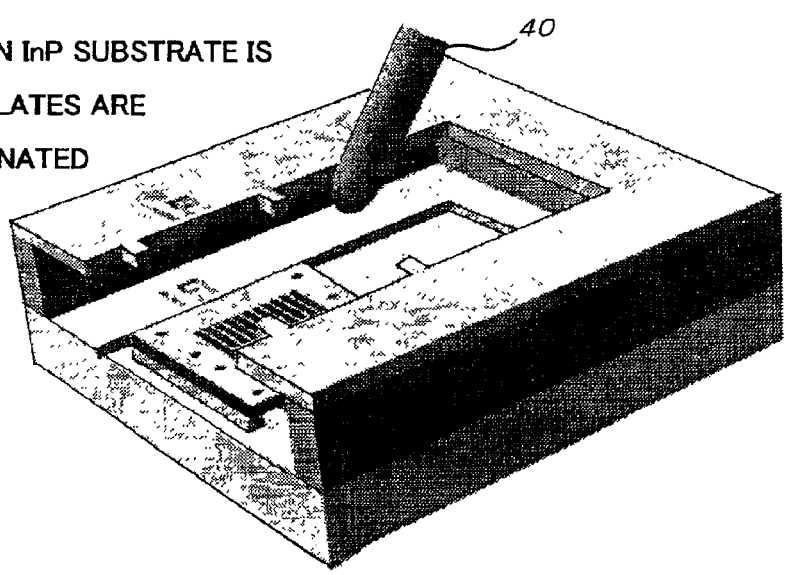
Figure 7A:
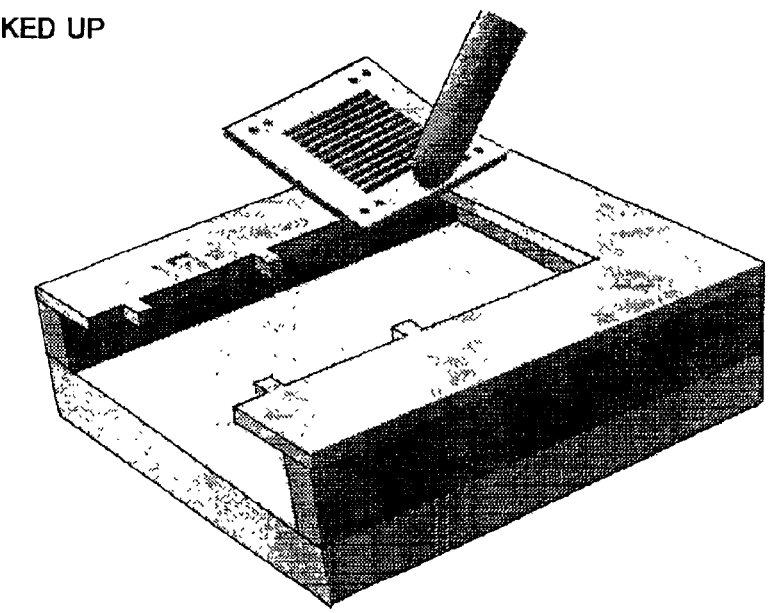
FIGS. 7(a) and 7(b) are explanatory views each showing a manner for constituting a three-dimensional photonic crystal by laminating two-dimensional photonic crystal plates.
Figure 7B:
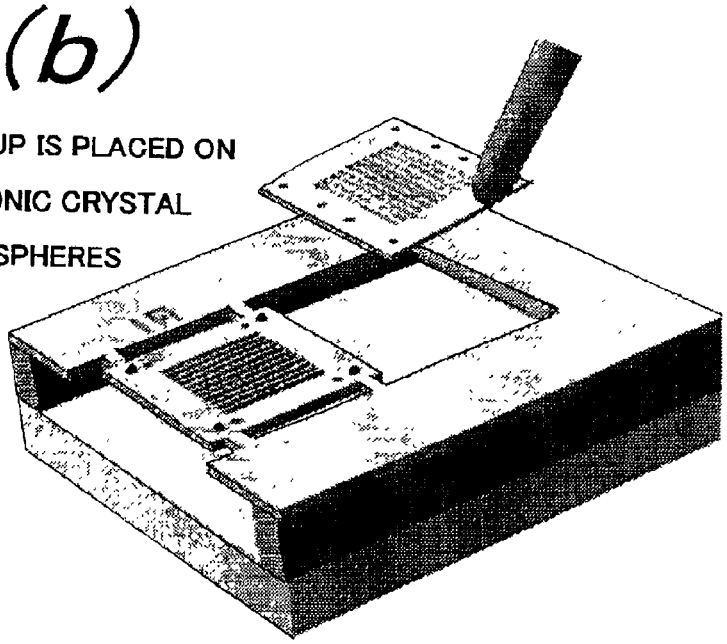

Then, the extreme end of a probe 40 is allowed to attach a microsphere 20, and the probe 40 to which has been attached the microsphere 20 is moved to fit the same into a through hole 18 defined on a frame 16a (16b) (see FIG. 5(a)).

In this case, it is to be noted that a radius of the through hole 18 defined on the two-dimensional photonic crystal plate 14a (14b) is the same as a thickness of the two-dimensional photonic crystal plate 14a (14b). In other words, when the two-dimensional photonic crystal plate 14a is superposed on the two-dimensional photonic crystal plate 14b, a diameter and a height of a circular cylinder defined by the through holes 18, 18, which have been defined at the same positions in two pieces of the two-dimensional photonic crystal plates 14a (14b), are identical with each other. In this respect, a diameter of the microsphere 20 coincides with the diameter as well as with the height of the above-described circular cylinder. A material of the microsphere 20 may be, for example, a plastic such as polystyrene, an inorganic compound such as silica, or the same material as that of the two-dimensional photonic crystal plate 14a (14b).

In order to manipulate such microsphere 20, a probe 40 having around 0.5 μm diameter in its extreme end thereof is used. When a top of the microsphere 20 is touched with the probe 40, the microsphere 20 is sticked onto the extreme end of the probe 40 by means of electrostatic force and/or van der Waals force. Either the microsphere 20 thus sticked onto the extreme end of the probe 40 is fitted into the through hole 18 of the air bridge type two-dimensional photonic crystal plate 14a (14b), which comes to be a first layer (see FIG. 5(b)), or the microsphere 20 thus sticked is fitted into a hole of a two-dimensional photonic crystal pattern (corresponding to the through hole 18), which has been defined on an InP substrate by removing the air bridge type two-dimensional photonic crystal plate 14a (14b) in the case where the photonic crystal pattern had been etched until it reaches the InP substrate (see FIG. 6(a)).

(2) Procedure Step 2

Then, the probe 40 is pushed against another air bridge type two-dimensional photonic crystal plate 14a (14b), which comes to be a second layer, whereby the air bridge type two-dimensional photonic crystal plate 14a (14b) is separated from bridges 32, and the two-dimensional crystal plate 14a (14b) thus separated is picked up by the probe 40 to be placed on the first layer into which microspheres 20 have been already inserted (see FIGS. 6(a) and 6(b), or FIGS. 7(a) and 7(b). In this manipulation, a probe 40 having around 10 μm diameter in its extreme end is used.

In case of separating the air bridge type two-dimensional photonic crystal plate 14a (14b) from the bridges 32, when a sharp notch has been previously given to each bridge 32 at a position, where it is intended to be broken, it is effective for easily breaking the bridge 32 at the position corresponding to the notch.

A notch has been given to a junction between a two-dimensional photonic crystal plate 14a (14b) and each of the bridges 32, the two-dimensional photonic crystal plate 14a (14b) is easily separated from the bridges 32, when notched positions in junctions are pushed by means of the probe 40. When the two-dimensional photonic crystal plate 14a (14b) thus separated is touched with the extreme end of the probe 40, it is sticked onto the extreme end of the probe 40 as in the case where a microsphere 20 is picked up by the probe 40.

(3) Procedure Step 3

In the case where a two-dimensional photonic crystal plate 14a (14b) is laminated on another two-dimensional photonic crystal plate 14b (14a) wherein microspheres 20 have been already inserted into its through holes 18, respectively, each hemispherical protruded portion of a microsphere 20 functions as a guide for positioning these two-dimensional photonic crystal plates 14a (14b) and 14b (14a). Accordingly, when the two-dimensional photonic crystal plate 14a (14b) is made to be close to a vicinity of correct laminating position, microspheres 20 engage with through holes 18 in the two-dimensional photonic crystal plate 14a (14b), respectively, so that the two-dimensional photonic crystal plate 14a (14b) is inevitably secured to the correct position. Furthermore, when the laminated two-dimensional photonic crystal plate 14a (14b) is pushed against the other plate 14b (14a) laid below, both the two-dimensional photonic crystal plates 14a (14b) and 14b (14a) become closely contact with each other.

(4) Procedure Step 4

Operations in the Procedure Steps 1 through 3 as described above are repeated.

Figure 8A:
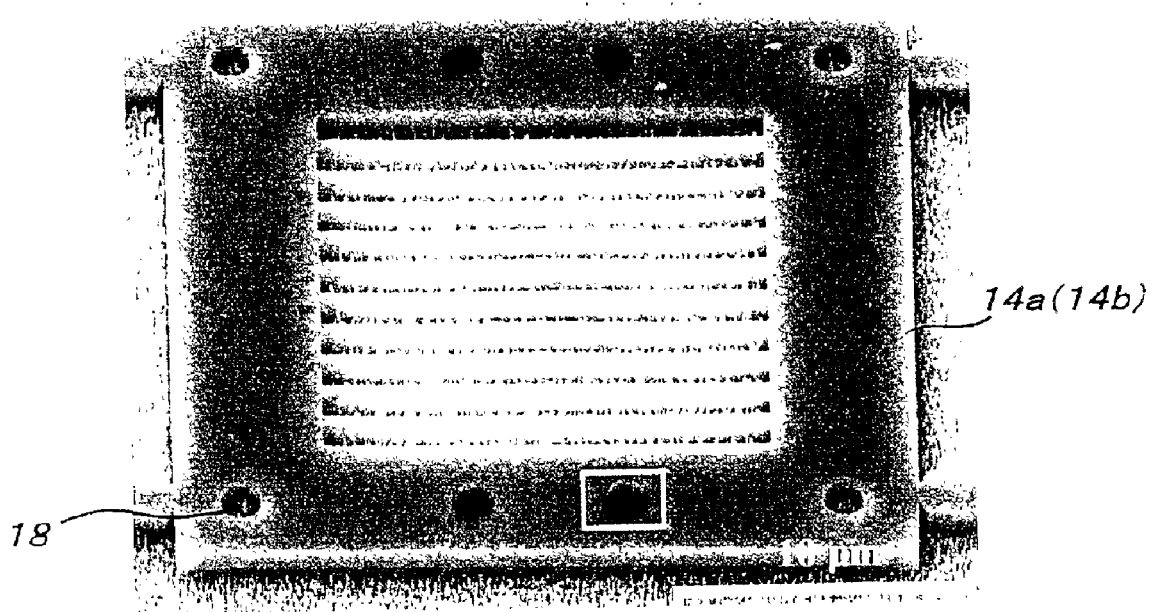
Figure 8B:
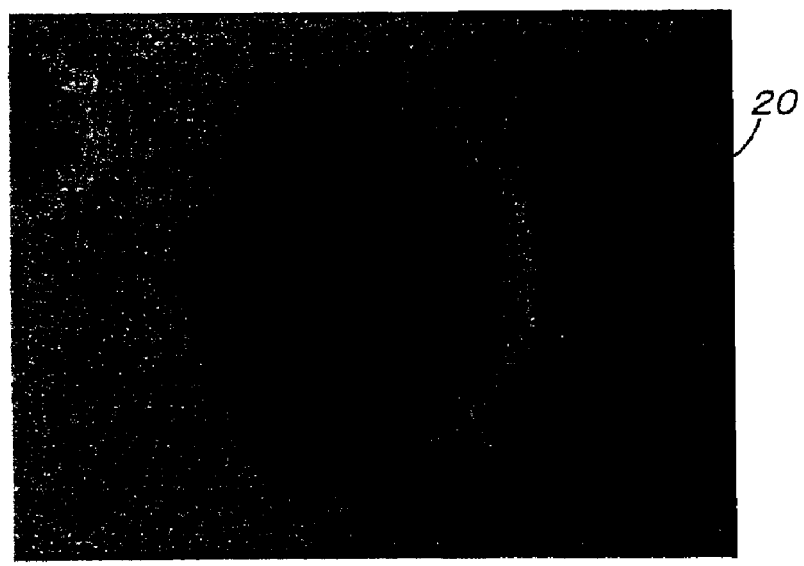

FIGS. 8(a) and 8(b) are electron micrographs wherein FIG. 8(a) is the one showing a state in which microspheres inserted into holes of the 2D photonic plate, which has been defined on an InP substrate and FIG. 8(b) is an enlarged one showing a part enclosed by a white rectangle in FIG. 8(a).

Figure 9A:
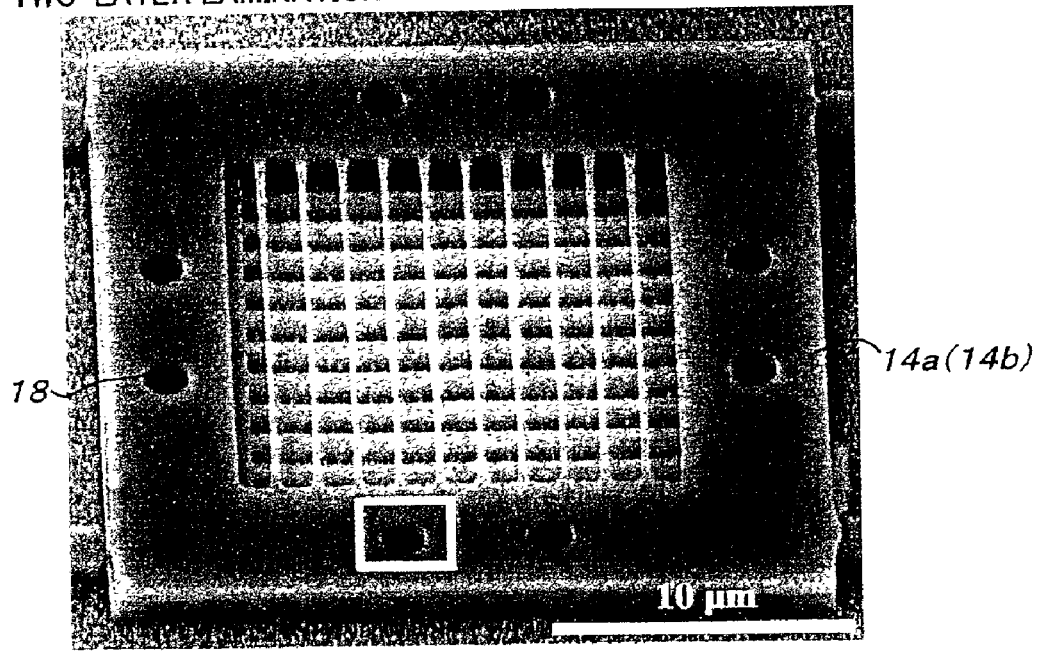
Figure 9B:
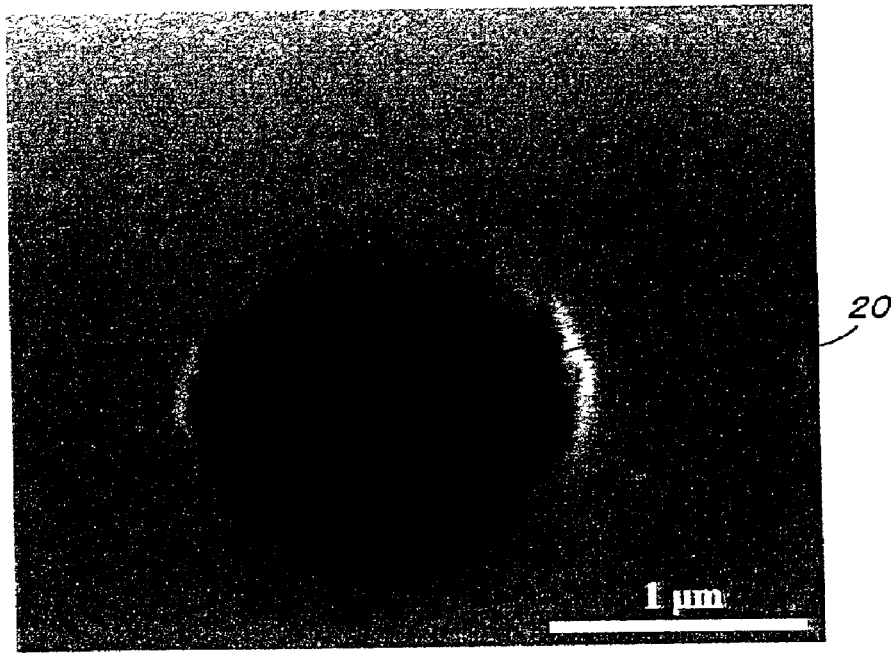

Likewise, FIGS. 9(a) and 9(b) are electron micrographs wherein FIG. 9(a) is the one showing a state in which two layers of two-dimensional photonic crystal plates 14a (14b) are laminated, and FIG. 9(b) is an enlarged one of a part enclosed by a white rectangle in FIG. 9(a).

Figure 10A:
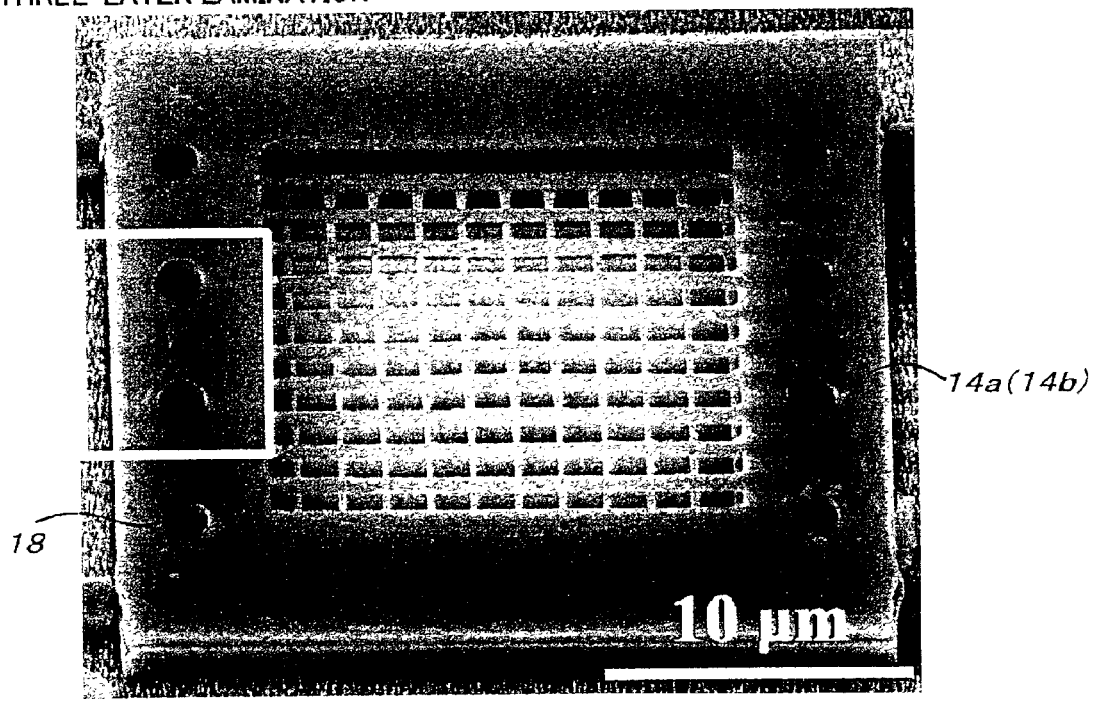
Figure 10B:
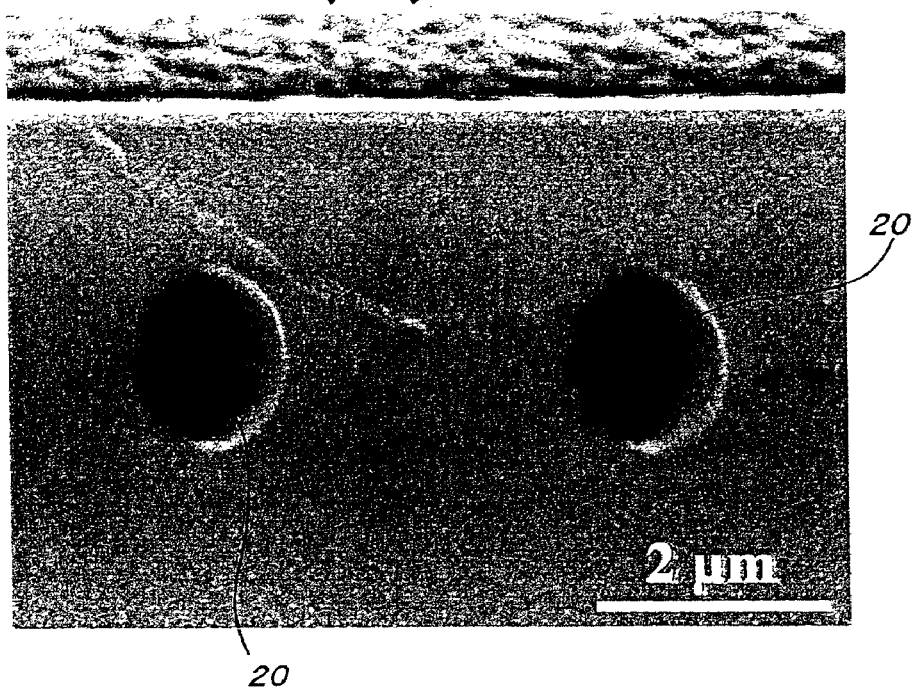

As are the cases with the above figures, FIGS. 10(a) and 10(b) are electron micrographs wherein FIG. 10(a) is the one showing a state in which three layers of two-dimensional photonic crystal plates 14a (14b) are laminated, and FIG. 10(b) is an enlarged one of apart enclosed by a white rectangle in FIG. 10(a).

Figure 11:
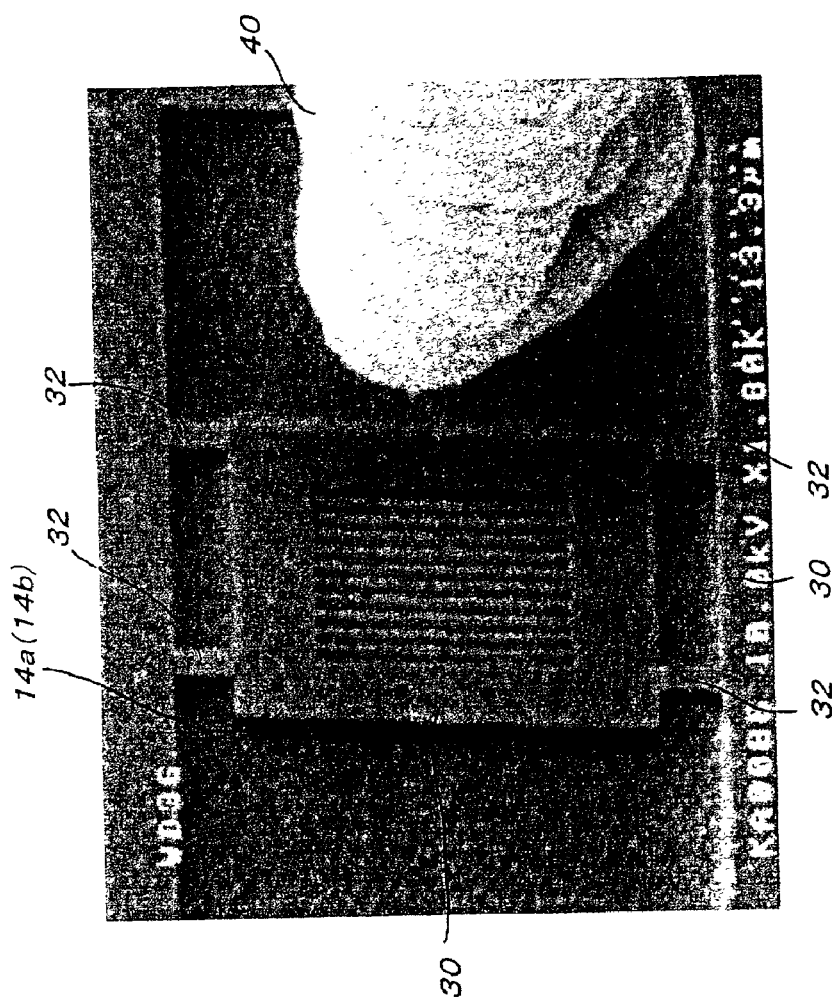
FIG. 11 is an electron micrograph showing a state wherein bridges are pushed with a probe to cut off a two-dimensional photonic crystal plate from an outer hull region of a substrate.

Moreover, FIG. 11 is an electron micrograph showing a state wherein bridges 32 are pushed by a probe 40 to cut off a two-dimensional photonic crystal plate 14a (14b) from an outer hull region 30 of a substrate.

Figure 12:
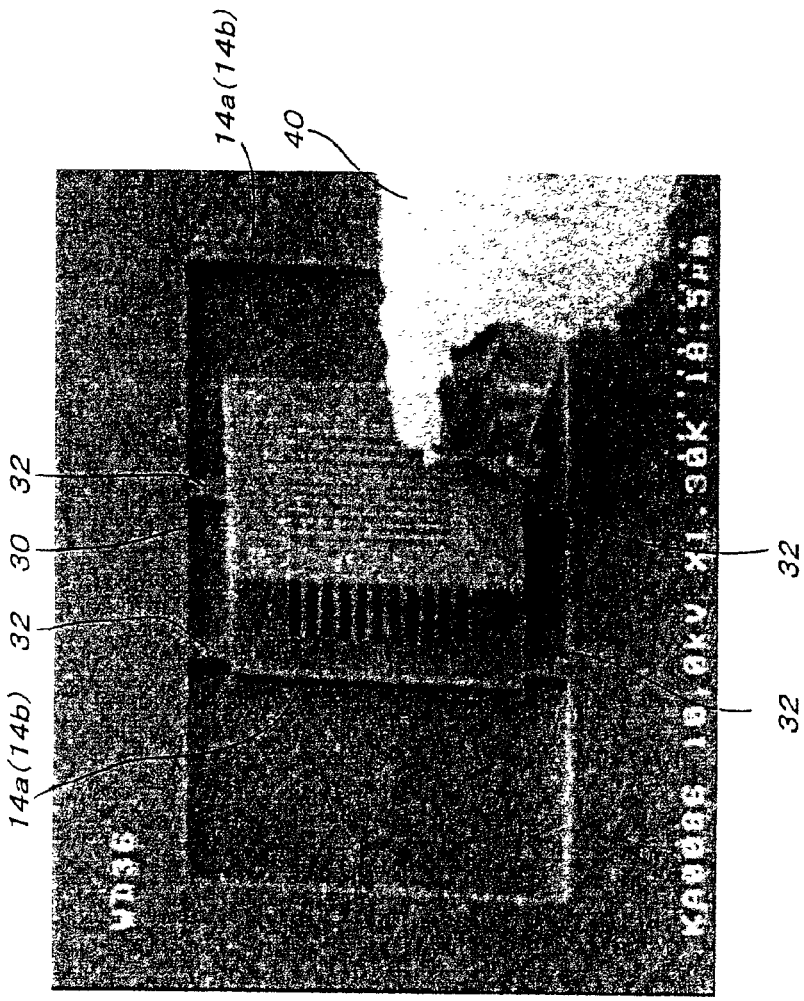
FIG. 12 is an electron micrograph showing a state wherein a two-dimensional photonic crystal, which has been cut off and sticked on a probe, is brought on another two-dimensional photonic crystal wherein positioning microspheres have been inserted into through holes.

FIG. 12 is an electron micrograph showing a state wherein a two-dimensional photonic crystal 14b (14a), which has been cut off and sticked onto a probe, is brought on another two-dimensional photonic crystal 14a (14b) in which microspheres 20 used for positioning have been inserted into through holes 18.

Figure 13:
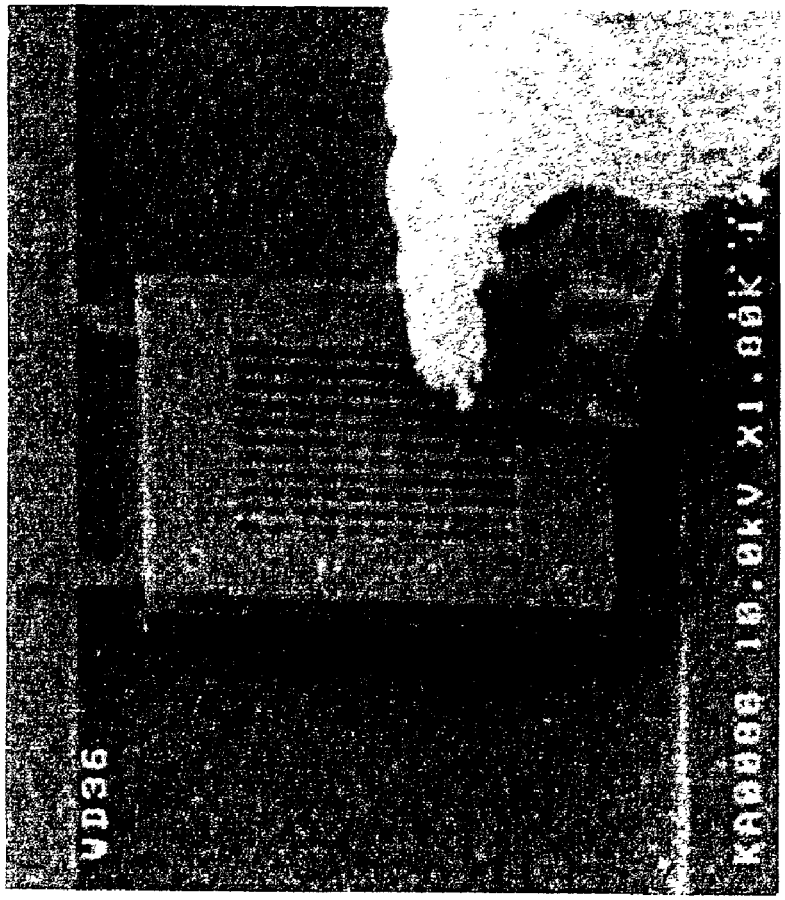
FIG. 13 is an electron micrograph showing a state wherein two pieces of two-dimensional photonic crystal plates are superposed substantially completely one another.

FIG. 13 is an electron micrograph showing a state wherein two pieces of two-dimensional photonic crystal plates 14a (14b) are superposed substantially completely one another.

In the following, optical characteristics will be described with respect to the above-described examples. A measuring condition for the optical characteristics is as follows.

Measuring Device: Measuring device for spectra of reflected waves

Resolution: 16 $\mu m^{-1}$

Angle of Incidence: 20 degrees (spread angle±10 degrees) A state wherein cone-like light is input to a sample centering around 20 degrees Polarized Light: None Detector: MCT, 77K cooling Number of Times in Scanning: 1024

Scanned Wavelength Zone: 1.43 $\mu m$ to 14.3 $\mu m$

Detected light: Reflected light

Since the three-dimensional photonic crystal described in the examples is designed so as to open a photonic bandgap in 4 $\mu m$ zone, the light in 4 $\mu m$ zone should be perfectly reflected by the three-dimensional photonic crystal in the case when reflected waves were measured.

Figure 14:
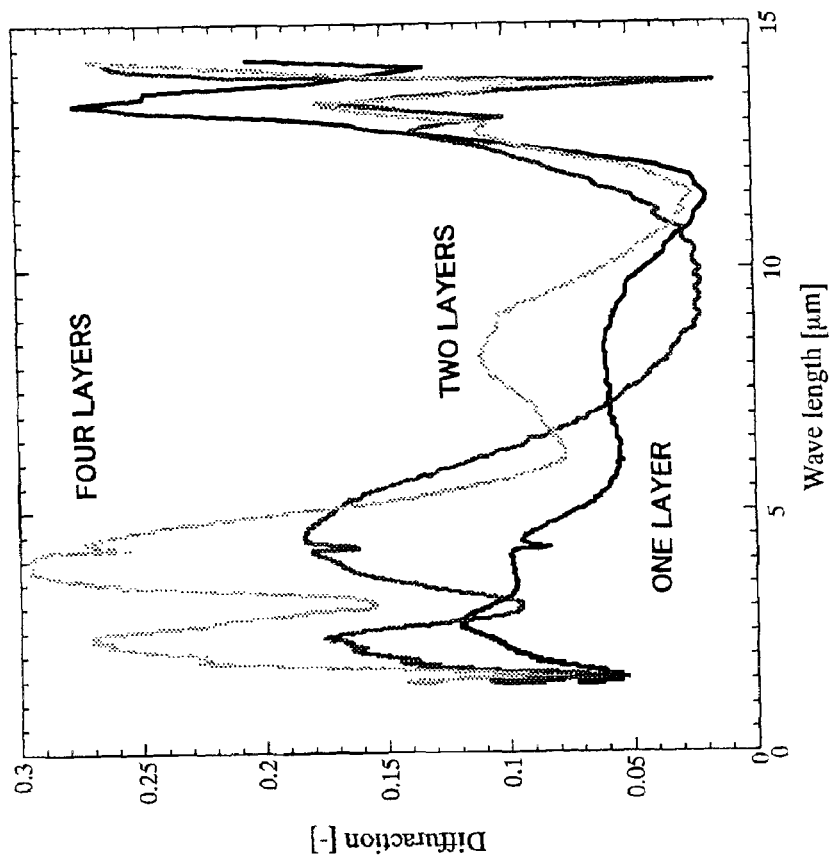
FIG. 14 is a graphical representation indicating spectra in the case when reflected waves are measured in each increase of one layer of a two-dimensional photonic crystal plate wherein one layer (¼ period), three layers (¾ period), and four layers (one period) are laminated one another, respectively.

FIG. 14 is a graphical representation indicating spectra in the case when reflected waves are measured in the above-described condition with each increase of one layer of a two-dimensional photonic crystal plate wherein one layer (¼ period), three layers (¾ period), and four layers (one period) are laminated one another. With increase in the number of layer, each peak of wavelength in 4 $\mu m$ band became stronger. This means that a photonic bandgap is formed gradually. Furthermore, each sharp gap appearing in a central portion of each peak is derived from absorption due to stretch of carbonyl (C=O) of carbon dioxide in air. Each peak appearing in 2 $\mu m$ band exhibits reflection due to a higher mode.

A wavelength threshold of photonic bandgap may be set, for example, to 100 nm to 1 mm.

As described above, a phase in a direction perpendicular to a surface of a two-dimensional photonic crystal plate 14a (14b) is allowed to change arbitrarily, so that the two-dimensional photonic crystal plate 14a (14b) can be laminated as designed. Accordingly, this is a manner suitable for preparing photonic band crystals.

In addition, since a lithographic technique is used in the above-described embodiment, it becomes possible to introduce an arbitrary optical phase control region (defect region).

More specifically, when a three-dimensional photonic crystal 10 is prepared by laminating two-dimensional photonic crystal plates 14a (14b) as described above, not only a simple lamination of the two-dimensional photonic crystal plates 14a (14b) is conducted by the use of a probe 40, but also minute components such as light-emitting materials, and defect components, which constitute an optical phase control region (defect region), can be inserted into (embedded in) the two-dimensional photonic crystal plates 14a (14b) in case of preparing the three-dimensional photonic crystal with the use of the probe 40.

In this case, it is not necessary that quality of material in these minute components is the same as that of the two-dimensional photonic crystal plates 14a (14b), but the above-described light-emitting materials each having different quality of material or materials each having a different refractive index from that of the above-described two-dimensional photonic crystal plate 14a (14b) may be used.

Furthermore, since a lithographic technique is used in the above-described embodiment, a three-dimensional minute structure of around submicron order can be arranged, so that the resulting product can be applied to an optical element used in a wavelength region having 0.2 $\mu m$ to 10 $\mu m$ wavelengths of light.

It is to be noted that the above-described embodiment as well as examples may be modified as in the following paragraphs (1) through (8).

(1) In the above-described embodiment, a probe prepared by metal-coating around glass fibers is used as a probe 40 wherein a diameter of the extreme end of the probe (corresponding to a part of the glass fibers) has been made to be around 0.5 $\mu m$. However, the present invention is not limited thereto as a matter of course. For instance, a probe may be made optionally from glass, metals and the like. An adhesive force for sticking a two-dimensional photonic crystal plate 14a (14b) or a microsphere 20 onto the extreme end of a probe may be arranged to control by means of ON/OFF of electric field. Besides, for the sake of increasing sticking performance by expanding a contact area with respect to a two-dimensional photonic crystal plate 14a (14b), a diameter of the extreme end of a probe may be increased to a value more than that of micron order, for example, it may be a value extending from 10 nm to 1 mm.

Figure 15A:
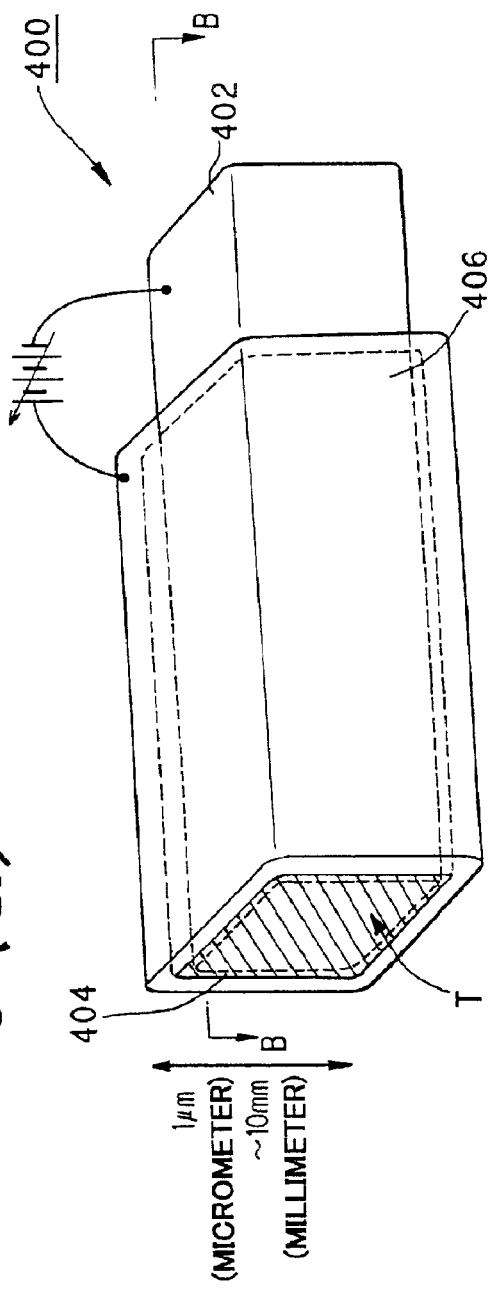
FIGS. 15(a), 15(b), and 15(c) are explanatory views each showing a probe according to another preferred embodiment.
Figure 15B:
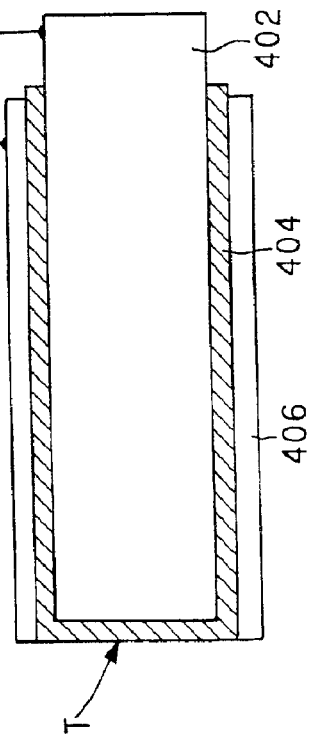
Figure 15C:
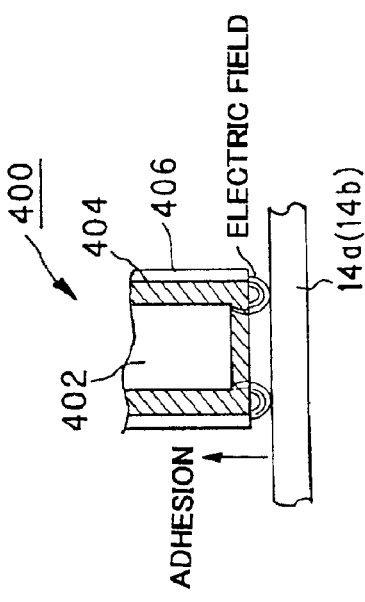

More specifically, a probe, for example, as shown in FIGS. 15(a), 15(b), and 15(c) may be used. A probe 400 shown in FIGS. 15(a), 15(b), and 15(c) is composed of an inner core 402, an insulating layer 404 formed around the inner core 402, and an outer metallic film 406 formed on an outer periphery of the insulating layer 404 except for an extreme end portion T thereof.

In this case, the inner core 402 is made from a hard metal such as tungsten, while the insulating layer 404 is formed by depositing $SiO_2$, $SiN_x$ or the like in accordance with CVD and the like. Furthermore, the outer metallic film 406 is formed by depositing Ni or Au in accordance with a manner such as vapor deposition.

The extreme end portion T formed by the insulating layer 404 is constituted so as to define a flat surface and a size of which is, for example, "1 $\mu m \times 1$ $\mu m = 1$ $\mu m^2$" to "10 mm×10 mm=100 $mm^2$" in the case where the extreme end portion T is square.

In the probe 400, when a voltage is applied across the inner core 402 and the outer metallic film 406, an electric field appears in the vicinity of an edge of the extreme end portion T, whereby a two-dimensional photonic crystal plate 14a (14b) or a microsphere 20 can be electrostatically adhered.

In this case, the outer metallic film 406 functions as a shield by which electric field is not leaked to the outside. If there is no shield, a picture image is confused in case of observation by electron microscope. For this reason, it is preferred to provide a shield.

In addition, the outer metallic film 406 functions also to stabilize electric potential in a two-dimensional photonic crystal plate 14a (14b). In general, a minute substance under observation of electron microscope has been charged at a variety of electric potentials dependent upon an observing condition at that time, or a history until that moment. Accordingly, a certain minute substance is not necessarily sticked by a probe to which a voltage has been previously applied.

However, when it is arranged in such that the outer metallic film 406 has been in contact with a two-dimensional photonic crystal plate 14a (14b), an electric potential of the two-dimensional photonic crystal plate 14a (14b) is fixed to an equipotential state in the outer metallic film 406. Accordingly, adhesion or separation can be made always in accordance with manipulator's intension with good reproducibility.

Figure 16A:
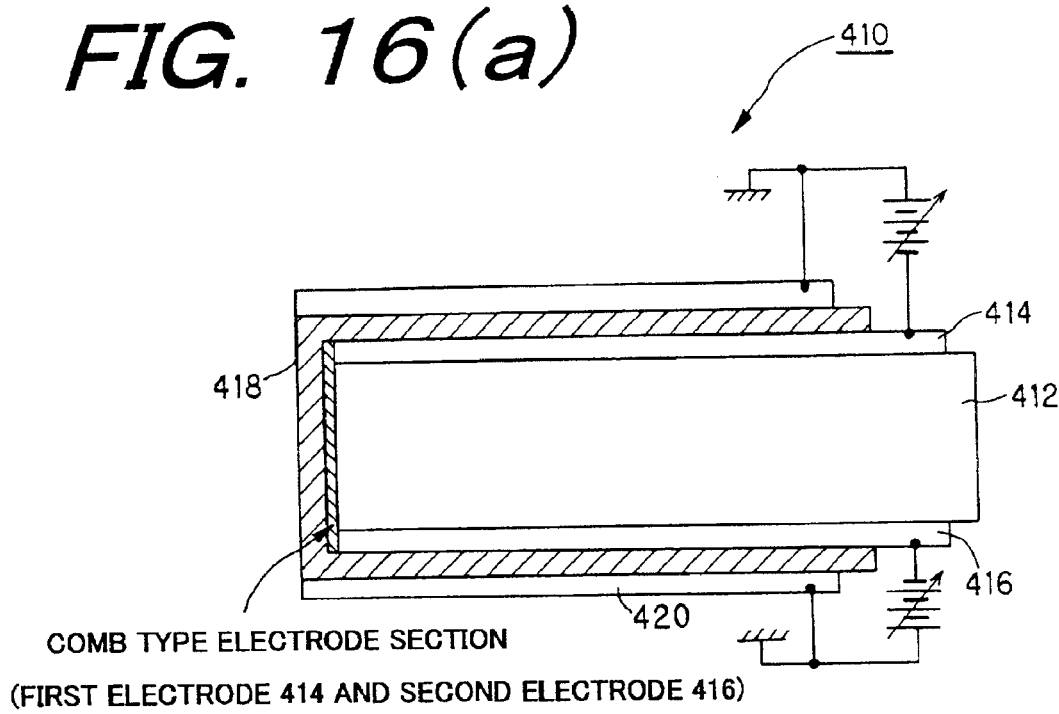
FIGS. 16(a) and 16(b) are explanatory views each showing a probe according to a further preferred embodiment.
Figure 16B:
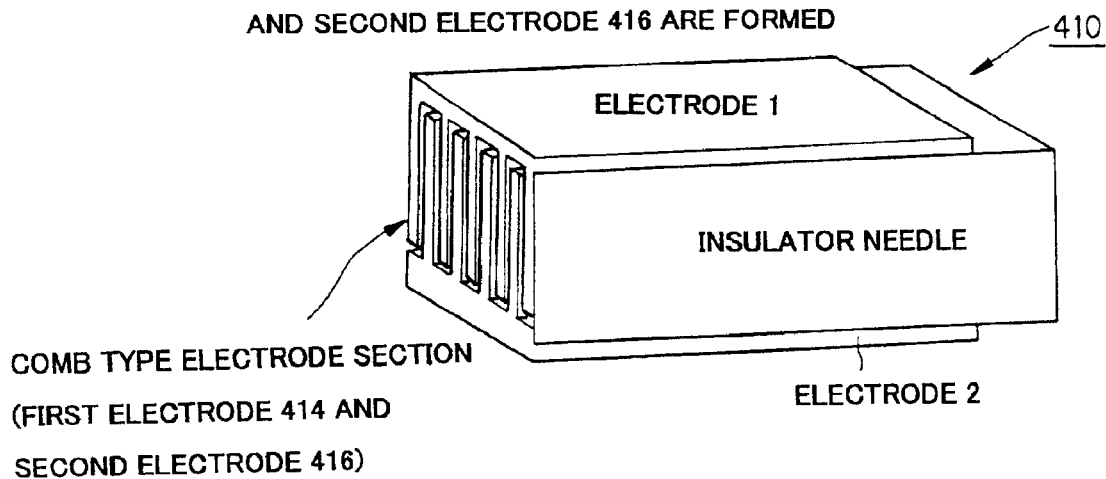

FIGS. 16(a), and 16(b) are diagrams each showing a structure of another probe wherein a probe 410 is modified in such that an extreme end electrode section of a probe as shown in FIGS. 15(a), 15(b), and 15(c) is made to be comb-shaped, whereby its adhesive force is elevated.

Namely, an insulator needle 412 an extreme end portion of which is made to be a flat surface is provided with a first electrode 414 and a second electrode 416 in the probe 410. In this case, the first electrode 414 and the second electrode 416 are arranged to constitute comb-shaped electrodes (convex and concave portions of the first and the second electrodes 414 and 416 correspond to teeth of combs, respectively, and they are staggered with each other) on the flat surface of the extreme end portion of the insulator needle 412.

After forming the first electrode 414 and the second electrode 416 in accordance with the manner as described above, an insulating film 418 made of $SiO_2$ or the like is deposited thereon to cover these first and second electrodes 414 and 416. A metallic shield 420 is formed on the outer periphery of the insulating film 418 except for a side of the extreme end portion, which has been made to be a flat surface, of the insulator needle 412.

In the above-described probe 410, when different voltages with respect to the metallic shield 420 (ground) are applied to the first electrode 414 and the second electrode 416, respectively, an electric field appears on the flat surface in the extreme end portion of the insulator needle 412, whereby a two-dimensional photonic crystal plate 14a (14b) or a microsphere 20 can be electrostatically adhered.

(2) In the above-described embodiment, positioning for superposing two-dimensional photonic crystal plates 14a and 14b has been conducted by inserting microspheres 20 into through holes 18 defined on frames 16a and 16b of the two-dimensional photonic crystal plates 14a and 14b. However, the invention is not limited thereto as a matter of course. For instance, two-dimensional photonic crystal plates 14a and 14b may be allowed to abut against a structure having a predetermined configuration such as a wall surface to position them one another. In this case, it is preferred that respective sections of the two-dimensional photonic crystal plate 14a and the two-dimensional photonic crystal plate 14b have the same dimensions, respectively, with each other.

More specifically, a wall surface 500 involving at least one corner and constituted with concavo-convex planes may be provided as shown in FIG. 18(*a*), and outside surfaces of frames 16a and 16b of two-dimensional photonic crystal plates 14a and 14b are allowed to abut against the wall surface 500 to implement positioning of the two-dimensional photonic crystal plates 14a and 14b. In this case also, it is preferred that respective sections of the two-dimensional photonic crystal plate 14a and the two-dimensional photonic crystal plate 14b have the same dimensions, respectively, with each other.

Likewise, a flat wall surface 502 involving at least one corner may be constituted as shown in FIG. 18(*b*), and outside surfaces of frames 16a and 16b of two-dimensional photonic crystal plates 14a and 14b are allowed to abut against the wall surface 502 to conduct positioning of the two-dimensional photonic crystal plates 14a and 14b. In this case also, it is preferred that respective sections of the two-dimensional photonic crystal plate 14a and the two-dimensional photonic crystal plate 14b have the same dimensions, respectively, with each other.

Furthermore, a plurality of columns 504 may be set up as shown in FIG. 18(*c*), and outside surfaces of frames 16a and 16b of two-dimensional photonic crystal plates 14a and 14b are allowed to abut against these columns 504 to effect positioning of the two-dimensional photonic crystal plates 14a and 14b. In this case also, it is preferred that respective sections of the two-dimensional photonic crystal plate 14a and the two-dimensional photonic crystal plate 14b have the same dimensions, respectively, with each other.

Moreover, it may be arranged in such that a concave 506 is defined as shown in FIG. 18(*d*), and outside surfaces of frames 16a and 16b of two-dimensional photonic crystal plates 14a and 14b are allowed to abut against a wall surface 506a defined by the concave 506 to effect positioning of the two-dimensional photonic crystal plates 14a and 14b. In this case also, it is preferred that respective sections of the two-dimensional photonic crystal plate 14a and the two-dimensional photonic crystal plate 14b have the same dimensions, respectively, with each other.

Besides, a plurality of rectangular solids 508 may be set up as shown in FIG. 19(*a*), and outside surfaces of frames 16a and 16b of two-dimensional photonic crystal plates 14a and 14b are allowed to abut against these rectangular solids 508 to conduct positioning of the two-dimensional photonic crystal plates 14a and 14b. In this case also, it is preferred that respective sections of the two-dimensional photonic crystal plate 14a and the two-dimensional photonic crystal plate 14b have the same dimensions, respectively, with each other.

In addition, a plurality of L-shaped members 510 may be set up as shown in FIG. 19(*b*), and outside surfaces of frames 16a and 16b of two-dimensional photonic crystal plates 14a and 14b are allowed to abut against these L-shaped members 510 to make positioning of the two-dimensional photonic crystal plates 14a and 14b. In this case also, it is preferred that respective sections of the two-dimensional photonic crystal plate 14a and the two-dimensional photonic crystal plate 14b have the same dimensions, respectively, with each other.

According to the manners as described above, there is no need to define through holes 18 and the like on frames 16a and 16b of two-dimensional photonic crystal plates 14a and 14b, besides, it is not required to use any microsphere 20, so that the two-dimensional photonic crystal plates 14a and 14b can be easily positioned.

(3) The following materials can be used as the one for a two-dimensional photonic crystal plate.

The group III–V, the group VI, and the group II–VI semiconductors such as InP, GaAs, and InGaAs-based semiconductors Si, Ge, and SiGe-based semiconductors AlInGaN-based semiconductors ZnMgCdTeSe-based semiconductors and the like Insulators of $SiN_x$, $SiO_2$, $TiO_2$ and the like Organic matters of PMMA, polyimide and the like (4) In the above-described embodiment, although a profile of a through hole 18 defined on frames 16a and 16b of two-dimensional photonic crystal plates 14a and 14b has been a circle, and a contour of a microsphere has been constituted in a spherical body, the invention is not limited thereto as a matter of course. Accordingly, a profile of the through hole 18 to be defined on frames 16a and 16b of two-dimensional photonic crystal plates 14a and 14b may be an arbitrary profile such as square, and rectangle, while a contour of a microsphere 20 may be an arbitrary one such as regular hexahedron, and rectangular solid so as to fit in the profile of the through hole 18.

(5) In the above-described embodiment, explanation has been such that two types of two-dimensional photonic crystal plates such as a two-dimensional photonic crystal plate 14a and a two-dimensional photonic crystal plate 14b are employed, and these plates are laminated alternately so as to obtain a periodical structure in response to wavelengths of light to form a three-dimensional photonic crystal 10. However, the invention is not limited thereto as a matter of course. Namely, three types or more of two-dimensional photonic crystal plates may be laminated so as to obtain a periodic structure in response to wavelengths of light, whereby a three-dimensional photonic crystal is constituted.

(6) While an explanation has been omitted in the above-described embodiment, plural types of two-dimensional photonic crystal plates necessary for constituting a three-dimensional photonic crystal may be fabricated either on a single substrate in a lump as in the case of the two-dimensional photonic crystal plate 14a and the two-dimensional photonic crystal plate 14b in the above-described embodiment, or on different substrates, respectively.

(7) In the above-described embodiment, through holes 18 have been defined on frames 16a and 16b, but the invention is not limited thereto as a matter of course.

Figure 17A:
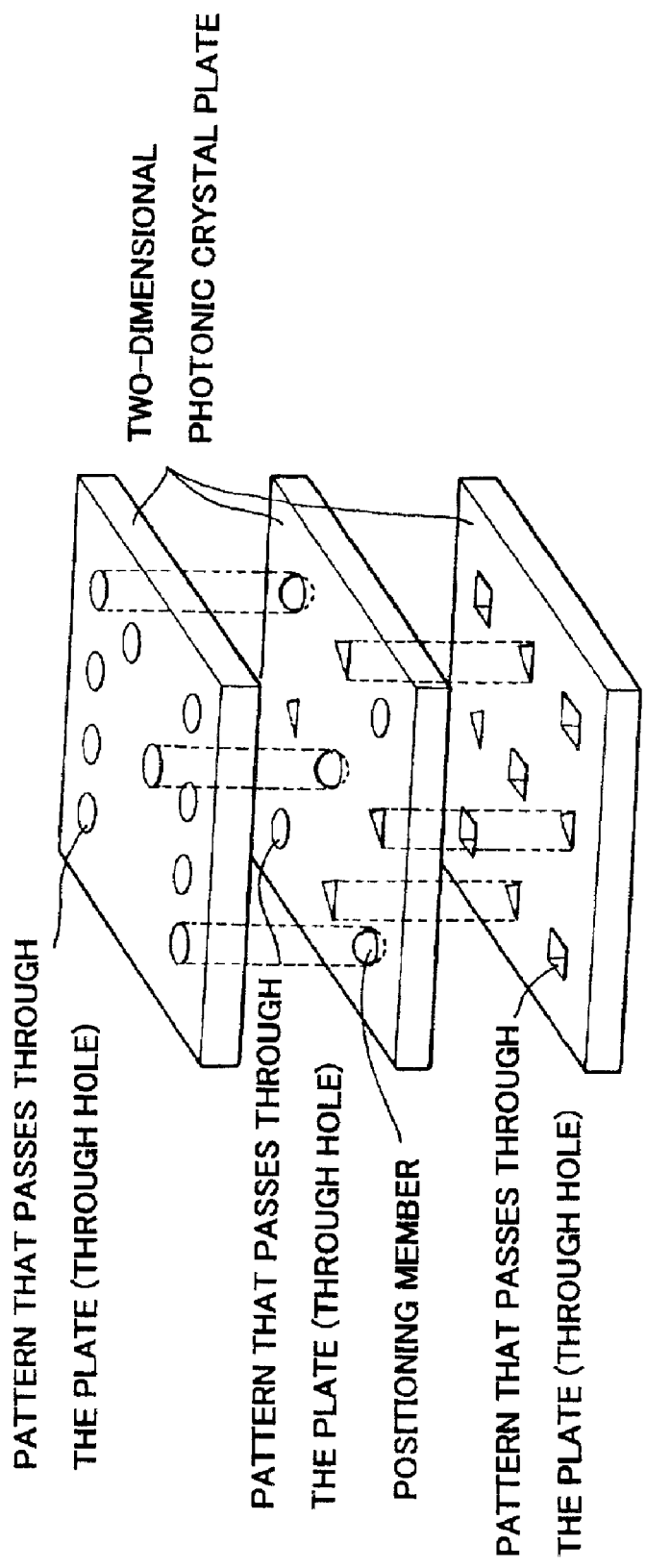
FIG. 17(a) is a perspective explanatory view showing a case where positioning is made by using a part of each two-dimensional photonic crystal patterns, while 17(b) is a perspective explanatory view showing a case where positioning is made by using a through hole defined on each of two-dimensional photonic crystal patterns.

For instance, as shown in FIG. 17(a), two-dimensional photonic crystal plates adjacent to each other among a plurality of two-dimensional photonic crystal plates are correctly laminated with each other, and in this case, positions in the two-dimensional photonic crystal plates thus laminated at which patterns passing through each of the laminated two-dimensional photonic crystal plates among two-dimensional photonic crystal patterns of the laminated two-dimensional photonic crystal plates correspond to each other may be used as through holes.

Figure 17B:
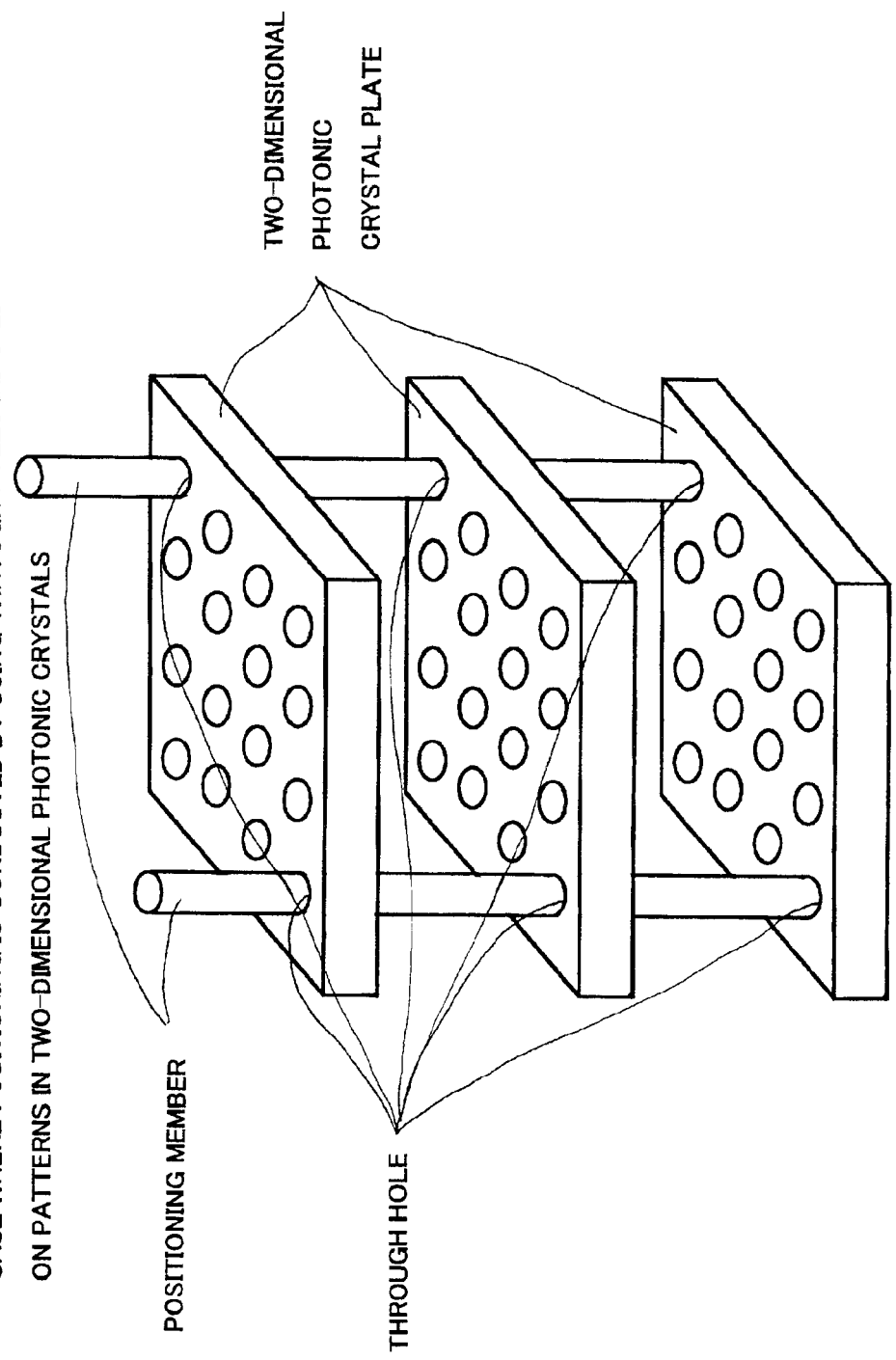
Figure 18A:
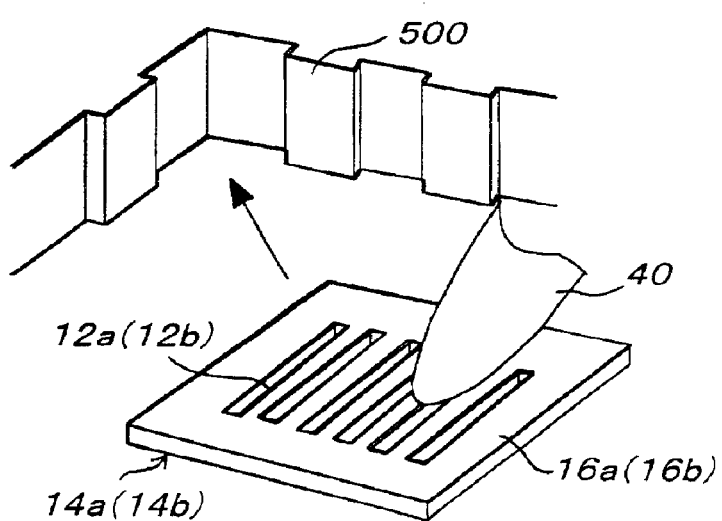
FIGS. 18(a), 18(b), 18(c), and 18(d) are explanatory views each showing another positioning method for two-dimensional photonic crystal plates.
Figure 18B:
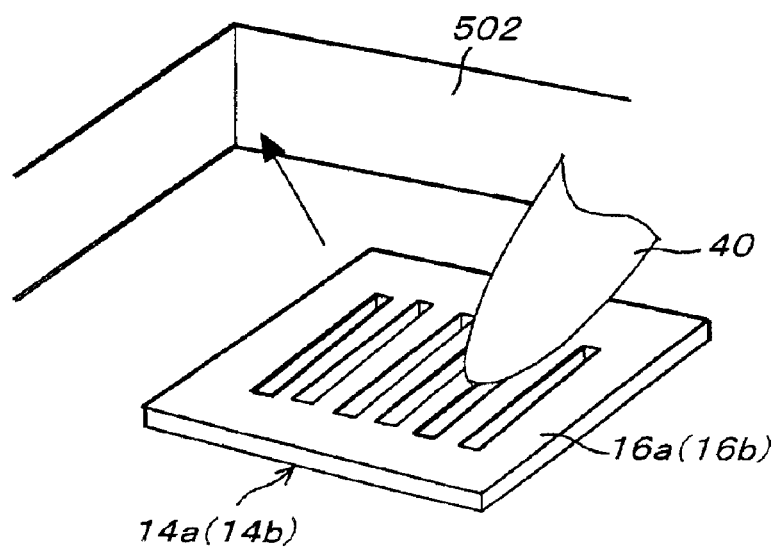
Figure 18C:
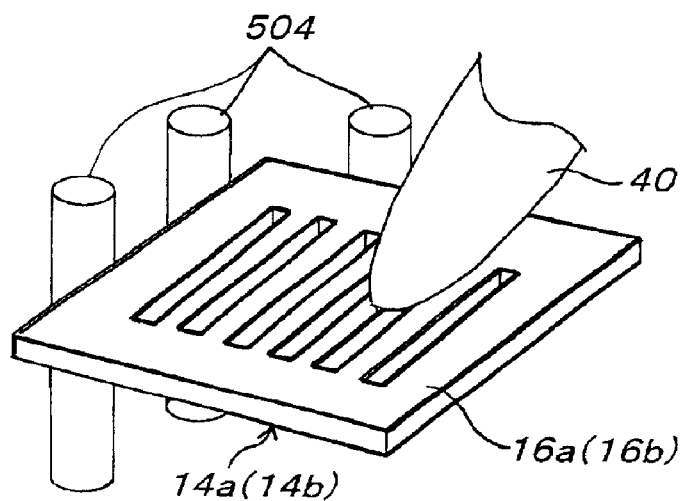
Figure 18D:
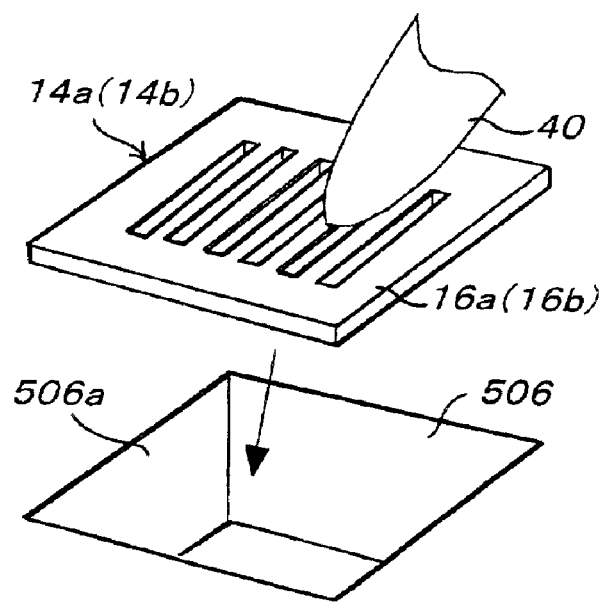

On one hand, through holes are defined in a region surrounded by two-dimensional photonic crystal patterns of two-dimensional photonic crystal plates as shown in FIG. 17(b), and a positioning member may be located in the thorough holes thus defined.

(8) The above-described embodiment as well as the modifications described in the paragraphs (1) through (7) may be optionally combined with each other.

Since the present invention has been constituted as described above, an advantage of providing a practically effective three-dimensional photonic crystal, and a process for the production thereof as well as a probe used therefor can be obtained.

More specifically, it becomes possible to realize an optical device wherein three-dimensional photonic crystals are employed by the present invention. Optical devices wherein three-dimensional photonic crystals are used include, for example, low threshold laser device, light-emitting device, lossless circuit, branching filter and the like. When an active element such as laser device, and light-emitting device is fabricated from three-dimensional photonic crystals, advantages of reduction in driving electric power, first wavelength oscillation and the like are obtained.

On one hand, when a passive element such as lossless circuit, and branching filter is fabricated from three-dimensional photonic crystals, such device is very small as compared with a conventional optical fiber and the like, so that a highly integrated optical circuit can be obtained.

In other words, the above-described process for the production of three-dimensional photonic crystals according to the present invention is excellent particularly in the following points.

(1) Since a manner for laminating two-dimensional photonic crystal plates is employed, structural accurancy is maintained. No matter how thick the crystal becomes. Accordingly, a highly accurate three-dimensional photonic crystal in response to optical wavelengths can be fabricated.

(2) Since a manner for laminating two-dimensional photonic crystal plates is employed, an arbitrary structural body can be fabricated by lamination. Accordingly, fabrication of diamond and quasidiamond periodic crystals is possible, so that fabrication of photonic bandgap crystals becomes possible.

(3) Since a manner for laminating two-dimensional photonic crystal plates is employed, an optical phase control region (defect region) can be easily inserted into a three-dimensional photonic crystal.

Therefore, a process for the production of three-dimensional photonic crystals according to the present invention is suitable for fabricating optical devices.

It will be appreciated by those of ordinary skill in the art that the present invention can be embodied in other specific forms without departing from the spirit or essential characteristics thereof.

The presently disclosed embodiments are therefore considered in all respects to be illustrative and not restrictive. The scope of the invention is indicated by the appended claims rather than the foregoing description, and all changes that come within the meaning and range of equivalents thereof are intended to be embraced therein.

The entire disclosure of Japanese Patent Application No. 2001-228287 filed on Jul. 27, 2001 including specification, claims, drawing and summary are incorporated herein by reference in its entirety.

What is claimed is:

1. A three-dimensional photonic crystal, comprising:
   a plurality of two-dimensional photonic crystal plates each provided with two-dimensional photonic crystals having a two-dimensional periodic structure aligned in striped form; and
   said pluralities of two-dimensional photonic crystal plates being positioned respectively and laminated by stacking so as to obtain a periodic structure having a periodicity on the order of wavelengths of light wherein said two-dimensional photonic crystals are rotated at 90° to each other.

2. A three-dimensional photonic crystal, comprising:
   a plurality of two-dimensional photonic crystal plates each provided with through holes and different types of two-dimensional photonic crystals;
   a plurality of positioning members; and
   said positioning members being located in said through holes in said plurality of two-dimensional photonic crystal plates adjacent to each other among said pluralities of two-dimensional photonic crystal plates being laminated so that said pluralities of the two-dimensional photonic crystal plates form a periodic structure having a periodicity on the order of to wavelengths of light.

3. A three-dimensional photonic crystal, comprising:
   a flat plate-like first two-dimensional photonic crystal plate provided with first through holes on a first frame as well as with first two-dimensional photonic crystals in a region inside said first frame;
   a flat plate-like second two-dimensional photonic crystal plate provided with second through holes, being positioned with respect to said first through holes, on a second frame as well as with second two-dimensional photonic crystals in a region inside said second frame;
   positioning members; and
   said positioning members being located so that said through holes in said first two-dimensional photonic crystal plate are positioned to be communicated with said through holes in said second two-dimensional photonic crystal plate, whereby said first two-dimensional photonic crystal plate is laminated with said second two-dimensional photonic crystal plate so as to obtain a periodic structure having a periodicity on the order of wavelengths of light.

4. A three-dimensional photonic crystal as claimed in claim 3 wherein said first through holes and said second through holes are circular holes, respectively, a radius in each of said circular holes is substantially equal to thicknesses of said first two-dimensional photonic crystal plate and said second two-dimensional photonic crystal plate, and each of said positioning members is a sphere having a diameter corresponding to substantially doubled radius of said circular hole.

* * * * *